(12) United States Patent
Byers et al.

(10) Patent No.: US 7,585,932 B2
(45) Date of Patent: Sep. 8, 2009

(54) POLYMER COMPOSITIONS AND PROCESSES FOR MAKING AND USING SAME

(75) Inventors: Jim D Byers, Bartlesville, OK (US); Mitchell D Refvik, Bartlesville, OK (US); Chad W Brown, Bartlesville, OK (US); Michael S Matson, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 213 days.

(21) Appl. No.: 11/464,318

(22) Filed: Aug. 14, 2006

(65) Prior Publication Data

US 2007/0055033 A1    Mar. 8, 2007

Related U.S. Application Data

(60) Provisional application No. 60/708,435, filed on Aug. 16, 2005.

(51) Int. Cl.
C08G 75/04 (2006.01)
(52) U.S. Cl. .......... 528/376; 528/364; 528/392
(58) Field of Classification Search .......... 526/319
See application file for complete search history.

(56) References Cited

U.S. PATENT DOCUMENTS

| | | | |
|---|---|---|---|
| 3,041,284 A | 6/1962 | Calhoun et al. | |
| 3,114,734 A | 12/1963 | Gobrad et al. | |
| 3,211,674 A | 10/1965 | Sandridge | |
| 3,278,496 A | 10/1966 | LeFave et al. | |
| 3,446,780 A | 5/1969 | Bertozzi | |
| 3,465,057 A | 9/1969 | Cameron et al. | |
| 3,686,326 A | 8/1972 | Oswald et al. | |
| 3,707,552 A | 12/1972 | Dobinson et al. | |
| 3,742,006 A | 6/1973 | Doss | |
| 3,746,685 A | 7/1973 | Dobinson et al. | |
| 3,853,959 A | 12/1974 | Dobinson et al. | |
| 3,884,951 A | 5/1975 | Oswald | |
| 3,914,288 A | 10/1975 | Garnish et al. | |
| 3,916,067 A | 10/1975 | Jones et al. | |
| 3,926,822 A | 12/1975 | Habiby | |
| 3,953,347 A | 4/1976 | Habiby | |
| 3,981,901 A | 9/1976 | Guthrue et al. | |

(Continued)

FOREIGN PATENT DOCUMENTS

DE    300174    5/1992

(Continued)

OTHER PUBLICATIONS http://www.cognis.com/NR/rdonlyres/FDE0E9E1-DAE2-4950-B7FA-5EAF67B40C18/0/Folder_26.pdf.*

(Continued)

*Primary Examiner*—David Wu
*Assistant Examiner*—Vu Nguyen

(57) ABSTRACT

Poly(β-thioether ester) compositions, methods of making the poly(β-thioether ester) compositions, and methods of using the poly(β-thioether ester) compositions are provided. The poly(β-thioether ester) can be produced by contacting a thiol ester composition and an α,β-unsaturated ester to produce a mixture and then heating the mixture to produce the poly(β-thioether ester). In some embodiments, the thiol ester compositions include thiol esters, hydroxy thiol esters, and cross-linked thiol esters.

48 Claims, 1 Drawing Sheet

U.S. PATENT DOCUMENTS

| | | | |
|---|---|---|---|
| 3,986,966 A * | 10/1976 | Wakim | 508/345 |
| 3,991,089 A | 11/1976 | Schwab et al. | |
| 4,045,472 A | 8/1977 | Guthrie et al. | |
| 4,119,640 A * | 10/1978 | Hodakowski et al. | 549/546 |
| 4,218,332 A | 8/1980 | Schwab et al. | |
| 4,231,956 A | 11/1980 | Sullivan et al. | |
| 4,254,185 A | 3/1981 | Buter | |
| 4,340,707 A | 7/1982 | Queis et al. | |
| 4,504,651 A | 3/1985 | Yamaguchi et al. | |
| 4,566,878 A | 1/1986 | Karol et al. | |
| 4,626,562 A | 12/1986 | Motomura et al. | |
| 4,636,242 A | 1/1987 | Timmons | |
| 5,126,425 A | 6/1992 | Sesagawa et al. | |
| 5,405,426 A | 4/1995 | Timmons et al. | |
| 5,411,776 A | 5/1995 | Schmidt et al. | |
| 5,422,422 A | 6/1995 | Bader et al. | |
| 5,454,851 A | 10/1995 | Zlotnikov et al. | |
| 5,538,531 A | 7/1996 | Hudson et al. | |
| 5,925,726 A | 7/1999 | Seppala et al. | |
| 5,932,681 A | 8/1999 | Herold et al. | |
| 6,039,781 A | 3/2000 | Goertz et al. | |
| 6,221,994 B1 | 4/2001 | Galbiati et al. | |
| 6,231,633 B1 | 5/2001 | Hirano et al. | |
| 6,358,296 B1 | 3/2002 | Markusch et al. | |
| 6,583,302 B1 * | 6/2003 | Erhan et al. | 554/213 |
| 7,279,448 B2 * | 10/2007 | Erhan et al. | 508/491 |
| 2003/0204030 A1 * | 10/2003 | Higuchi et al. | 525/535 |
| 2005/0197390 A1 | 9/2005 | Byers et al. | |
| 2005/0197391 A1 | 9/2005 | Refvik et al. | |
| 2006/0000252 A1 | 1/2006 | Carstens et al. | |
| 2006/0009365 A1 | 1/2006 | Erhan et al. | |
| 2006/0036110 A1 | 2/2006 | Brown et al. | |
| 2006/0111520 A1 | 5/2006 | Byers et al. | |
| 2007/0055033 A1 | 3/2007 | Byers et al. | |
| 2007/0112100 A1 | 5/2007 | Byers et al. | |

FOREIGN PATENT DOCUMENTS

| | | |
|---|---|---|
| EP | 0 308 664 | 8/1988 |
| EP | 0 716 057 | 6/1996 |
| FR | 1 194 553 | 11/1959 |
| GB | 908986 | 10/1962 |
| GB | 1292214 | 10/1972 |
| GB | 1312821 | 4/1973 |
| GB | 1312822 | 4/1973 |
| GB | 1 484 062 | 8/1977 |
| GB | 2188327 | 9/1987 |
| JP | 60123506 | 7/1985 |
| JP | 1 090169 | 4/1989 |
| JP | 1090167 | 6/1989 |
| JP | 1090168 | 6/1989 |
| JP | 1090170 | 6/1989 |
| JP | 2003-252956 | 9/2003 |
| WO | WO 86/06371 | 11/1986 |
| WO | WO 02/053672 | 7/2002 |
| WO | WO 03/006569 | 1/2003 |
| WO | WO 03/082958 | 10/2003 |
| WO | WO 03/082958 A1 * | 10/2003 |
| WO | WO 2005/080325 | 1/2005 |
| WO | WO 2005/014564 | 2/2005 |
| WO | WO 2005/123862 | 12/2005 |
| WO | WO 2005/022217 | 2/2007 |
| WO | WO 2007/021960 | 2/2007 |
| WO | WO 2007/035215 | 3/2007 |

OTHER PUBLICATIONS

Lu et al. Polymer 46 (Jan. 2005), 71-80.*

Search Report for International Patent Application No. PCT/US2005/005110 dated Jan. 24, 2006.

Elchueva, A.D., et al., "Influence of the Type of Oligoisocyanate on the Properties of Thiourethane Compounds," Russian J of Applied Chem, vol. 74 (2001) pp. 1040-1043.

Fitt, Peter S., et al., "Dithiols. Part XIX. Further Studies on the Deacetylation of Acetylated Dithiols," J of the Chem Society No. 5 (1957) pp. 2240-2249.

Derkach, N. Ya, et al., "Mercapto Derivatives of Alkylmalonic Esters," Chemical Abstracts, vol. 54, No. 22, (1960), Abstract No. 24386a.

Blackman L.C.F., et al. "Promoters for the Dropwise Condensation of Steam. Part II . . . ," J of the Chem Society, No. 1 (1957) pp. 165-169.

Mazaev, V.E., et al., "Preparation Reflux Mercaptoethanol Appropriate Acid," Derwent Publications, Week 197442, Abstract No. SU410010 (1974).

Demchuk, Dmitry V., et al. "Synthesis of 12- and 13-Membered Sulfur-Containing Lactones by Homolytic Macrocyclization . . . ," Synthesis, (1995) pp. 307-311.

Sudmeier, James L., et al. "Fast Kinetics by Stopped-Flow Chlorine-35 Nuclear Magnetic Resonance . . . " Inorganic Chem vol. 10 No. 4 (1971) pp. 860-863.

Tanaka, Kiyoshi, et al., "Oxidation of Thiol by 5-Arylidene, 1,3-Dimethylbarbituric Acid and Its Application . . . ," Tetrahedron Letters, vol. 28, No. 36 (1987) pp. 4173-4176.

Troyanysky, Emmanuil I., et al. "Stereoselective Free Radical Cycloaddition-Macrocyclization in Facile Synthesis . . . ," Tetrahedron, vol. 51, No. 42 (1995) pp. 11431-11444.

Chavdarian, Charles G., et al. "Synthesis, Redox Characteristics, and in Vitro Norepinephrine Uptake . . . " J of Medicinal Chem, vol. 22, No. 11 (1979) pp. 1317-1322.

Sjoberg, Bertil, "Uber Thioglycerine und einige verwandte Schwefelverbindungen," Berichte der Deutschen Chemischen Gesellschaft, vol. 75, No. 1 (1942) pp. 13-29.

Mayadunne, Roshan T.A., et al. "Multiarm organic compounds for use as reversible chain-transfer agents . . . ," Tetrahedron Letters, vol. 43, No. 38 (2002) pp. 6811-6814.

Miyake, Y., et al., "Enantioselective conversion of meso-cyclic disulfides to chiral cyclic sulfides . . . " J of the Chem Society, Perkin Trans 1, No. 10 (2000) pp. 1595-1599.

Bhattacharya, S., et al., "Synthesis of Macrocyclic Diacy/Dialkyl Glycerols Containing Disulfide Tether and Studies . . . " J Org Chem vol. 63, No. 25 (1998) pp. 9232-9242.

Apitzsch, et al. "Uber Sulfide aus alfa,alfa1-Disulfhydryl-thiogamma-pyron-beta, beta1- . . . ," Berichte der Deutschen Chemischen Gesellschaft, vol. 42 (1909) pp. 2940-2943.

Teplenicheva, Y.L., et al., "Ethyl 2-(alpha-hydroxyhexafluoroisopropyl)acrylate as a potential . . . " Russian Chemical Bulletin, vol. 46, No. 4 (1997) pp. 755-758.

Gala, D., et al., "A Practical Conversion of a Azetidinone to Penem: Synthesis of Sch 34343," Tetrahedron, vol. 48, No. 7, (1992) pp. 1175-1182.

Schonberg, A., et al., "Konstitution und Umsetzungen des Produktes aus Aceton-dicarbonsaure-diathylester . . . ," Chemische Berichte, vol. 99, No. 10 (1966) pp. 3327-3330.

Apitzsch, H., "Uber die Einwirkungvon Schwefelkohlenstoff und Atzkali auf Ketone," Berichte der Deutschen Chemischen Gesellschaft, vol. 41 (1908) pp. 4028-4039.

Fischer, G.C., et al., "Irreducible Analogues of Mevaldic Acid Coenzyme A Hemithioacetal as Potential Inhibitors, . . . " J Org Chem, vol. 50 No. 12 (1985) pp. 2011-2019.

Ferres, H., et al., "A diastereoselective sysnthesis of 4(RS), 6(SR)-mercaptomethylmevalonolactone, . . . " Tetrahedron Letters, vol. 24, No. 35 (1983) pp. 3769-3772.

Schwab, A.W., et al., "Hydrogen Sulfide Adducts of Methyl Oleate and Linoleate," J of the America Oil Chemists' Society, vol. 50 (1973) pp. 364-366.

Schwab, A.W., et al. "Free Radical Addition of Hydrogen Sulfide to Conjugated . . . ," J of the American Oil Chemists' Society, vol. 47 (1970) pp. 371-373.

International Application No. PCT/US2006/031419 Search Report, Mar. 8, 2007.

Kanemura, Y, et al. "Dithiols as Improvers for Polyurethanes," Chemical Abstracts, American Chemical Society, vol. 11, No. 22, Nov. 27, 1989 (XP000251903).

Search Report from International Patent Application No. PCT/US2006/031393, dated Jan. 1, 2007.

Search Report from Internatinal Patent Application No. PCT/US2006/031901 dated Nov. 11, 2006.

Olsen, Scand. Symp. Lipids, [Proc.], 11$^{th}$ (1982), Meeting Date 1981, 173-8.

Peppard, Proceedings of the Congress—European Brewery Conventions (1979), 17$^{th}$ 91-104.

Stokes et al., Fat Metabolism in higher plants, Archives of Biochemistry and Biophysics (1974), 162 (2), 638-48.

Dyer, et al, The Kinetics of the Reactions of Phenyl Isocyanate with Thiols, J. Org. Chem., 26, Aug. 1961, 2919-2925.

Dyer, et al., The Kinetics of the Reactions of Phenyl Isocyanate with Certain Thiols, J. Am. Chem. Soc., 79, Aug. 13, 1957, 366-369.

Robins, Metal Ion Catalysis in Mercaptan Isocyanate Reactions, Adv. In Urethane Science and Tech., 12, 1993, 25-58.

Silva, et al, Recent Developments in Polyurethane Catalysis: Catalytic Mechanisms Review, Catalysis Reviews, 46, 2004, 31-52.

Office Action dated Jun. 18, 2008, 8 pages, U.S. Appl. No. 11/060,696, filed Feb. 17, 2005.

Office Action dated Jun. 27, 2008, 8 pages, U.S. Appl. No. 11/059,792, filed Feb. 17, 2005.

Office Action dated Mar. 19, 2009, 8 pages, U.S. Appl. No. 11/059,792, filed Feb. 17, 2005.

Office Action dated Sep. 24, 2008, 8 pages, U.S. Appl. No. 11/464,318, filed Aug. 14, 2008.

Office Action dated Jun. 24, 2008, 5 pages, U.S. Appl. No. 11/060,675, filed Feb. 17, 2005.

Office Action dated Dec. 21, 2007, 5 pages, U.S. Appl. No. 11/060,675, filed Feb. 17, 2005.

Office Action dated Jul. 16, 2007, 8 pages, U.S. Appl. No. 11/060,675, filed Feb. 17, 2005.

Office Action dated Dec. 19, 2006, 7 pages, U.S. Appl. No. 11/060,675, filed Feb. 17, 2005.

Office Action dated Jun. 23, 2008, 8 pages, U.S. Appl. No. 11/204,728, filed Aug. 16, 2005.

Polythiols based on Mercaptocarboxylic Acids—Types, Properties and Applications, Bruno Bock Thio-Chemicals (www.brunobock.org), (Available online Mar. 12, 2005).

* cited by examiner

TABLE 1 – POLY (β-THIOETHER ESTERS) PRODUCED FROM THIOL ESTERS AND ACRYLATES

| Sample ID | Thiol Ester | Acrylate | Thiol Ester (wt. %) | Acrylate (wt. %) | XH:ACRYLATE Equivalent Ratio | DBU (wt. %) | OBSERVATIONS |
|---|---|---|---|---|---|---|---|
| 812-62-1 | MSO | HDDA | 9.248 | 2.757 | 0.96 | 0.07 | clear, very tacky, flexible (low catalyst) |
| 812-62-15 | MSO | HDDA | 9.399 | 2.602 | 1.04 | 0.07 | clear, tacky, more flexible (low catalyst) |
| 812-63-1 | MSO | HDDA | 9.242 | 2.763 | 0.96 | 0.21 | clear, slightly tacky, flexible (high catalyst) |
| 812-63-15 | MSO | HDDA | 9.398 | 2.593 | 1.04 | 0.21 | clear, slightly tacky, more flexible (high catalyst) |
| 812-64-1 | MSO | HDDA | 9.326 | 2.676 | 1.00 | 0.21 | clear, slightly tacky, flexible (high catalyst) |
| 812-71-1 | MSO | BDDA | 9.545 | 2.463 | 1.00 | 0.2 | easily removed, clear, flexible, slightly tacky |
| 812-71-15 | MSO | EGDM | 9.621 | 2.391 | 1.00 | 0.2 | easily removed, clear, flexible, tacky |
| 812-72-1 | MSO | BAEDA 1.5 | 7.540 | 4.481 | 0.99 | 0.2 | bubbles, very soft, rubber and slightly tacky |
| 812-72-15 | MSO | BAEDA 4 | 6.253 | 5.752 | 1.00 | 0.2 | some difficulty removing from pan, very soft, rubbery, slightly tacky |
| 812-73-1 | MSO | BAEDA 2 | 7.204 | 4.792 | 1.00 | 0.2 | bubbles, clear, tacky, flexible |
| 812-73-15 | MSO | BAEDM 2 | 7.163 | 4.834 | 1.00 | 0.2 | still liq after additional heating at 95C |
| 812-74-1 | MSO | TMPTA | 9.613 | 2.387 | 1.00 | 0.2 | bubbles, very easy to remove from pan, soft, rubbery |
| 812-74-15 | MSO | TMPTMA | 9.356 | 2.645 | 1.00 | 0.2 | easily removed, clear, flexible |
| 812-75-1 | MSO | PETA | 9.613 | 2.452 | 0.97 | 0.2 | lots of bubbles, set up while mixing, crumbly, foam like |
| 812-75-15 | CMSO | BDDA | 9.824 | 2.182 | 1.00 | 0.2 | easily removed, clear, flexible, slightly tacky |
| 812-76-1 | CMSO | EGDM | 9.892 | 2.117 | 1.01 | 0.2 | peeled easily from pan, clear, flexible, very tacky |
| 812-76-15 | CMSO | BAEDA 1.5 | 7.950 | 4.022 | 1.00 | 0.2 | bubbles, easily removed, clear, flexible, slightly tacky |
| 812-77-1 | CMSO | BAEDA 4 | 6.707 | 5.317 | 1.00 | 0.2 | could not remove from bottom of pan, very sticky |
| 812-77-15 | CMSO | BAEDA 2 | 7.623 | 4.373 | 1.00 | 0.2 | easily removed, clear, flexible, moderately tacky, some bubbles |
| 812-78-1 | CMSO | BAEDM 2 | 7.581 | 4.421 | 1.00 | 0.2 | never set up |
| 812-78-15 | CMSO | TMPTA | 9.893 | 2.124 | 0.99 | 0.2 | lots of bubbles, clear, easily removed, stiffer but still flexible |
| 812-79-1 | CMSO | TMPTMA | 9.650 | 2.349 | 1.00 | 0.2 | easily removed, clear, flexible, slightly tacky |
| 812-79-15 | CMSO | PETA | 9.887 | 2.106 | 1.00 | 0.2 | lots of bubbles, looks like foam rubber, broke apart easily |
| 812-80-1 | MCaO | BDDA | 9.798 | 2.208 | 1.00 | 0.2 | difficult to peel from pan, clear, tacky, flexible |
| 812-80-15 | MCaO | EGDM | 9.861 | 2.133 | 1.00 | 0.2 | could not remove from pan, gooey and tacky |
| 812-81-1 | MCaO | BAEDA 1.5 | 7.912 | 4.078 | 1.00 | 0.2 | could not remove bottom of pan, tacky |
| 812-81-15 | MCaO | BAEDA 4 | 6.650 | 5.338 | 1.00 | 0.2 | bottom surface extremely tacky, could not remove |
| 812-82-1 | MCaO | BAEDA 2 | 7.581 | 4.418 | 1.00 | 0.2 | solid when cooled, difficult to remove, clear, flexible, tacky |
| 812-82-15 | MCaO | BAEDM 2 | 7.547 | 4.452 | 1.00 | 0.2 | viscous liquid at room temp |
| 812-83-1 | MCaO | TMPTA | 9.860 | 2.133 | 1.00 | 0.2 | clear, flexible, rubbery - tore while removing |
| 812-83-15 | MCaO | TMPTMA | 9.626 | 2.380 | 1.00 | 0.2 | tacky, crumbles at edges, clear, flexible |
| 812-84-1 | MCaO | PETA | 9.867 | 2.308 | 0.93 | 0.2 | clear, rubbery, tore while removing from pan |

FIG. 1

POLYMER COMPOSITIONS AND PROCESSES FOR MAKING AND USING SAME

CROSS REFERENCE TO RELATED APPLICATIONS

This application claims the benefit of U.S. Provisional Patent Application Ser. No. 60/708,435 filed on Aug. 16, 2005, which hereby is incorporated by reference in its entirety.

BACKGROUND OF THE INVENTION

1. Field of the Invention

The invention relates to polymer compositions generally produced by a reaction of a thiol ester composition with an unsaturated hydrocarbon.

2. Description of Related Art

The chemical industry strives to make products, such as polymers, foams, and fuels, with less expensive feedstocks that are in abundant supply. As the fossil fuels slowly deplete over time, alternative sources are always being sought as replacements for fuels. Additionally, the chemical industry continuously strives to produce products and use feedstocks that are environmentally friendly in order to reduce potential hazards and risks related to safety and environmental issues.

SUMMARY OF THE INVENTION

The present invention provides novel compositions that are the reaction product of a thiol ester composition with an unsaturated hydrocarbon that contains a functional group sufficient to stabilize a reaction intermediate between a carbon-carbon unsaturated bond of the unsaturated hydrocarbon and a thiol group of the thiol ester composition so that polymerization occurs between the thiol ester composition and the unsaturated hydrocarbon. As examples, suitable functional groups can include esters, amides, ketones, nitrites, or others known in the art as suitable for this function. As further examples, such unsaturated hydrocarbons with stabilizing functionality can include $\alpha,\beta$-unsaturated ester compositions, $\alpha,\beta$-unsaturated amide compositions, $\alpha,\beta$-unsaturated ketone compositions, $\alpha,\beta$-unsaturated nitrile compositions, etc. As will be appreciated by those of skill in the art, polymerization of such systems will generally occur via Michael's addition reaction at the $\beta$ carbon, but any other suitable reaction mechanism known in the art for reacting such compositions can also be employed.

In an aspect, the present invention provides a polymer composition that is produced by reacting a thiol ester composition with an $\alpha,\beta$-unsaturated ester composition, an $\alpha,\beta$-unsaturated amide composition, an $\alpha,\beta$-unsaturated ketone composition, an $\alpha,\beta$-unsaturated nitrile composition, or any combination thereof. In embodiments, the thiol ester composition can be a hydroxy thiol ester (hydroxy thiol ester composition); alternatively, a crosslinked thiol ester (crosslinked thiol ester composition); alternatively, a mercaptanized unsaturated ester (mercaptanized unsaturated ester composition); alternatively, a mercaptanized epoxidized ester (mercaptanized epoxidized ester composition); or alternatively, a crosslinked mercaptanized unsaturated ester (crosslinked mercaptanized unsaturated ester composition).

When the thiol ester composition is reacted with the $\alpha,\beta$-unsaturated ester composition, a poly($\beta$-thioether ester) polymer is produced. When the thiol ester composition is reacted with the $\alpha,\beta$-unsaturated amide composition, a poly($\beta$-thioether amide) polymer is produced. When the thiol ester composition is reacted with the $\alpha,\beta$-unsaturated ketone composition, a poly($\beta$-thioether ketone) polymer is produced. When the thiol ester composition is reacted with the $\alpha,\beta$-unsaturated nitrile composition, a poly($\beta$-thioether nitrile) polymer is produced.

In addition to the polymers, methods of making the polymers are also provided as embodiments of the present invention. In an embodiment, the thiol ester composition is contacted with the $\alpha,\beta$-unsaturated ester composition, the $\alpha,\beta$-unsaturated amide composition, the $\alpha,\beta$-unsaturated ketone composition, the $\alpha,\beta$-unsaturated nitrile composition, or any combination thereof to form a mixture. The mixture is then cured to produce the polymer. In some embodiments, a catalyst is used to produce the polymers.

The polymers of the present invention have desirable physical properties. In some embodiments, for example, the polymers of the present invention have a glass transition temperature ranging between $-100°$ C. to $250°$ C. Other advantageous physical properties are described herein.

BRIEF DESCRIPTION OF THE DRAWINGS

FIG. 1 is a table that contains compositions and observations for numerous poly-($\beta$-thioether ester) polymer compositions prepared in accordance with embodiments of the present invention.

DETAILED DESCRIPTION OF THE INVENTION

In this specification "natural" refers to materials obtained, by any method, from naturally occurring fruits, nuts, vegetables, plants and animals. As an example, natural source oil refers to source oils extracted, and optionally purified, from naturally occurring fruits, nuts, vegetables, plants and animals. Additionally, unsaturated natural source oil refers to unsaturated source oils extracted, and optionally purified, from naturally occurring fruits, nuts, vegetables, plants, and animals. As another example, the unsaturated natural source oil can be derived from genetically modified nuts, vegetables, plant, and animal sources. As yet another example, the unsaturated natural source oil comprises a triglyceride derived from genetically modified nuts, vegetables, plant, and animal sources.

In this specification, "natural source raw material" refers to materials obtained by extraction, chemical breakdown, or chemical processing of "natural" materials. A non-limiting example includes natural source oils that can be extracted from naturally occurring fruits, nuts, vegetables, plants and animals. As another non-limiting example, glycerol and carboxylic acids or carboxylic acid esters, saturated or unsaturated, can be produced and isolated by the chemical processing of triglycerides extracted from naturally occurring fruits, nuts, vegetables, plants, and animals.

In this specification, "synthetic" refers to materials produced from chemical building blocks not directly derived from natural sources. For example, synthetic unsaturated ester oil can be produced by the reaction of synthetic ethylene glycol and a synthetic carboxylic acid, i.e. acrylic acid or propionic acid. Other types of synthetic materials will be apparent to those of skill in the art and are to be considered within the scope of the present invention.

Regardless of the definitions of natural and synthetic, the materials described herein can be produced from a combination of natural and synthetic materials, "semi-synthetic." As a non-limiting example, the unsaturated ester oils described in this specification can be obtained or produced from a combination of synthetic and natural source raw materials. For example, the unsaturated ester oil can be produced by the reaction of synthetic ethylene glycol and oleic acid isolated from a natural source oil. Alternatively, the unsaturated ester oil can be produced from the reaction of glycerol isolated from natural source oils and a synthetic carboxylic acid, i.e. acrylic acid. Alternatively, the unsaturated ester oil can be produced from glycerol and oleic acid isolated from natural source oils.

In this specification, "thiol ester composition" refers to an ester composition that includes "thiol ester molecules." The thiol ester molecule has at least one thiol group and at least one ester group within the thiol ester molecule.

In this specification, "hydroxy thiol ester composition" refers to an ester composition that includes "hydroxy thiol ester molecules." The hydroxy thiol ester molecule has at least one thiol group, at least one ester group, and at least one hydroxy or alcohol group within the hydroxy thiol ester molecule. Alternatively, the alcohol group and the thiol group can be combined in the same group, which is referred to as an "α-hydroxy thiol group."

In this specification, "epoxidized unsaturated ester composition" refers to an ester composition that has been produced by epoxidizing an unsaturated ester composition.

In one aspect of the invention, novel compositions are provided that are the reaction product of a thiol ester composition with an unsaturated hydrocarbon, wherein the hydrocarbon contains a functional group sufficient to stabilize a reaction intermediate between a carbon-carbon unsaturated bond of the unsaturated hydrocarbon and a thiol group of the thiol ester composition, such that polymerization occurs between the thiol ester composition and the unsaturated hydrocarbon. As examples, suitable functional groups can include esters, amides, ketones, nitrites, or others known in the art as suitable for this function. As further examples, such unsaturated hydrocarbons with stabilizing functionality can include α,β-unsaturated ester compositions, α,β-unsaturated amide compositions, α,β-unsaturated ketone compositions, α,β-unsaturated nitrile compositions, etc. In an aspect, the novel composition can be a reaction product of a thiol ester composition and composition comprising a material having at least two unsaturated hydrocarbon groups that contain a functional group sufficient to stabilize a reaction intermediate between a carbon-carbon unsaturated bond of the unsaturated hydrocarbon and a thiol group. In an embodiment, each of the least two unsaturated hydrocarbon groups that contain a functional group sufficient to stabilize a reaction intermediate between a carbon-carbon unsaturated bond of the unsaturated hydrocarbon and a thiol group can be independently selected from the group consisting of an α,β-unsaturated ester group, an α,β-unsaturated amide group, an α,β-unsaturated ketone group, and an α,β-unsaturated nitrile group. Generally, the α,β-unsaturated ester group, the α,β-unsaturated amide group, the α,β-unsaturated ketone group, and the α,β-unsaturated nitrile group can have any structure disclosed herein. As will be appreciated by those of skill in the art, polymerization of such systems will generally occur via Michael's addition reaction at the β carbon, but any other suitable reaction mechanism known in the art for reacting such compositions can also be employed.

Poly (β-Thioether Ester) Compositions

In an aspect, a polymer of the present invention can be called a poly(β-thioether ester). The poly(β-thioether ester) of the present invention comprises multiple groups having structure G2:

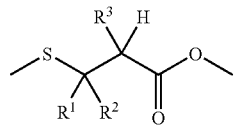

where each $R^1$, $R^2$, and $R^3$ can be H, an organyl group, or a hydrocarbyl group and the undesignated valencies represent the remainder of the structure of the polymer including additional groups having structure G2. In embodiments, the backbone of the poly(β-thioether ester) is linear; or alternatively, the backbone of the poly(β-thioether ester) is crosslinked. In some embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. In yet other embodiments, $R^1$, $R^2$, and $R^3$ are H, or $R^1$ and $R^2$ are H and $R^3$ is a methyl group, or a combination thereof. In yet other embodiments, $R^1$, $R^2$, and $R^3$ are H; or alternatively, $R^1$ and $R^2$ are H and $R^3$ is a methyl group.

The poly(β-thioether ester) of the present invention can be described as having a repeating unit D2:

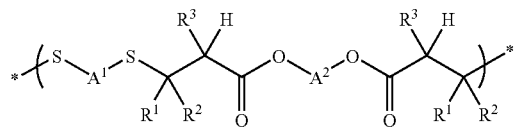

where each $R^1$, $R^2$, and $R^3$ can be H, an organyl group, or a hydrocarbyl group; $A^1$ and $A^2$ represent organyl and/or hydrocarbyl groups linking the sulfur atoms or the ester groups to each other respectively; and the undesignated valencies represent the remainder of the structure of the polymer including additional repeating units D2. In embodiments, the backbone of the poly(β-thioether ester) having repeating unit D2 is linear; or alternatively, the backbone of the poly(β-thioether ester) having repeating unit D2 is crosslinked. When the backbone of the poly(β-thioether ester) having repeating unit D2 is crosslinked, $A^1$ and/or $A^2$ further comprise additional repeating units D2. In some embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. In yet other embodiments, $R^1$, $R^2$, and $R^3$ are H, or $R^1$ and $R^2$ are H and $R^3$ is a methyl group, or a combination thereof In yet other embodiments, $R^1$, $R^2$, and $R^3$ are H; or alternatively, $R^1$ and $R^2$ are H and $R^3$ is a methyl group.

The repeating unit D2 of the poly(β-thioether ester) is comprised of two different units: U1 and U2.

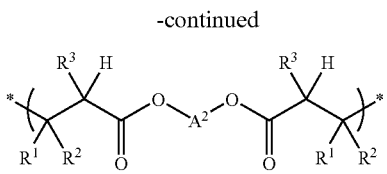

U2

Generally, unit U1 is derived from a thiol ester and U2 is derived from an α,β-unsaturated ester. Because units U1 and U2 are derived from two different materials, the structures of these units are independent of each other. Therefore, the poly(β-thioether ester) having the repeating unit D2 can be comprised of any combination of units U1 and U2. Alternatively, the poly(β-thioether ester) having the repeating unit D2 can comprise unit U1 derived from any thiol ester described herein and unit U2 derived from any α,β-unsaturated ester described herein.

The poly(β-thioether ester) of the present invention can alternatively be described as a polymer produced from a thiol ester composition and an α,β-unsaturated ester composition. The thiol ester composition and the α,β-unsaturated ester composition are independent elements of the poly(β-thioether ester). Therefore, the poly(β-thioether ester) can be described as a poly(β-thioether ester) produced from any combination of the thiol ester composition element described herein and the α,β-unsaturated ester composition element described herein.

In embodiments, the poly(β-thioether ester) of the present invention can be described as a product produced by any process described herein capable of producing the poly(β-thioether ester) and can be further described as being produced using any embodiments of the processes described herein.

In embodiments, the poly(β-thioether ester) can have a glass transition temperature, $T_g$, ranging between $-100°$ C. and $250°$ C. In some aspects, the glass transition temperature ranges from $-50°$ C. to $200°$ C.; alternatively, from $0°$ C. to $150°$ C.; alternatively, from $50°$ C. to $100°$ C.; or alternatively, from $-50°$ C. to $50°$ C. In some aspects, the glass transition temperature ranges from $-50°$ C. to $0°$ C.; alternatively, from $0°$ C. to $50°$ C.; alternatively, from $50°$ C. to $100°$ C.; alternatively, from $100°$ C. to $150°$ C.; alternatively, from $150°$ C. to $200°$ C.

Poly(β-Thioether Amide) Compositions

In an aspect, a polymer of the present invention can be called a poly(β-thioether amide). The poly(β-thioether amide) of the present invention comprises multiple groups having structure G3:

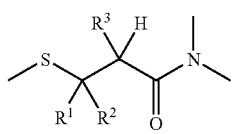

G3 where each $R^1$, $R^2$, and $R^3$ can be H, an organyl group, or a hydrocarbyl group and the undesignated valencies represent the remainder of the structure of the polymer including additional groups having structure G3. In embodiments, the backbone of the poly(β-thioether amide) is linear; or alternatively the backbone of the poly(β-thioether amide) is crosslinked. In some embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. In yet other embodiments, $R^1$, $R^2$, and $R^3$ are H, or $R^1$ and $R^2$ are H and $R^3$ is a methyl group, or a combination thereof In yet other embodiments, $R^1$, $R^2$, and $R^3$ are H; or alternatively, $R^1$ and $R^2$ are H and $R^3$ is a methyl group.

The poly(β-thioether amide) of the present invention can be described as having a repeating unit D3:

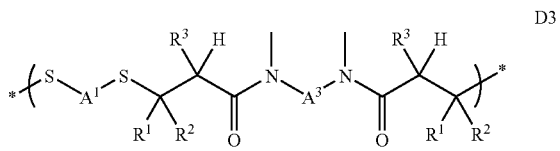

D3 where each $R^1$, $R^2$, and $R^3$ can be H, an organyl group, or a hydrocarbyl group, $A^1$ and $A^3$ represent organyl and/or hydrocarbyl groups linking the sulfur atoms or the ester groups to each other respectively, and the undesignated valencies represent the remainder of the structure of the poly(β-thioether amide) including additional repeating units D3. In embodiments, the backbone of the poly(β-thioether amide) having repeating unit D3 is linear; or alternatively, the backbone of the poly(β-thioether amide) having repeating unit D3 is crosslinked. When the backbone of the poly(β-thioether amide) having repeating unit D3 is crosslinked, $A^1$, $A^3$, and/or the undesignated nitrogen amide valencies further comprise additional repeating units D3. In some embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. In yet other embodiments, $R^1$, $R^2$, and $R^3$ are H, or $R^1$, $R^2$ are H and $R^3$ is a methyl group, or a combination thereof. In yet other embodiments, $R^1$, $R^2$, and $R^3$ are H; or alternatively, $R^1$ and $R^2$ are H and $R^3$ is a methyl group.

The repeating unit D3 of the poly(β-thioether amide) is comprised of two different units: U1 and U3.

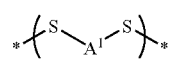

U1

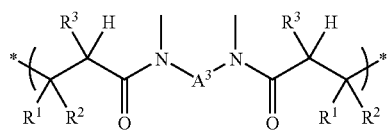

U3

Generally, unit U1 is derived from a thiol ester and U3 is derived from an α,β-unsaturated amide. Because units U1 and U3 are derived from two different materials, the structures of these units are independent of each other. Therefore, the poly(β-thioether amide) having the repeating unit D3 can be comprised of any combination of units U1 and U3. Alternatively, the poly(β-thioether amide) having the repeating unit D3 can comprise unit U1 derived from any thiol ester described herein and unit U3 derived from any α,β-unsaturated amide described herein.

The poly(β-thioether amide) of the present invention can alternatively be described as a polymer produced from a thiol ester composition and an α,β-unsaturated amide composition. The thiol ester composition and the α,β-unsaturated amide composition are independent elements of the poly(β-thioether amide). Therefore, the poly(β-thioether amide) can be described as a poly(β-thioether amide) produced from any combination of the thiol ester composition element described herein and the α,β-unsaturated amide composition element described herein.

In embodiments, the poly(β-thioether amide) of the present invention can be described as a product produced by any process described herein capable of producing the poly(β-thioether amide) and can be further described as being produced using any embodiments of the processes described herein.

Poly(β-Thioether Ketone) Compositions

In an aspect, a polymer of the present invention can be called a poly(β-thioether ketone). The poly(β-thioether ketone) of the present invention comprises multiple groups having structure G4:

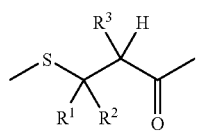

where each $R^1$, $R^2$, and $R^3$ can be H, an organyl group, or a hydrocarbyl group and the undesignated valencies represent the remainder of the structure of the polymer including additional groups having structure G4. In embodiments, the backbone of the poly(β-thioether ketone) is linear; or alternatively, the backbone of the poly(β-thioether ketone) is crosslinked. In some embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group.

The poly(β-thioether ketone) of the present invention can alternatively be described as a polymer produced from a thiol ester composition and an α,β-unsaturated ketone composition. The thiol ester composition and the α,β-unsaturated ketone composition are independent elements of the poly(β-thioether ketone). Therefore, the poly(β-thioether ketone) can be described as a poly(β-thioether ketone) produced from any combination of the thiol ester composition element described herein and the α,β-unsaturated ketone composition element described herein.

In embodiments, the poly(β-thioether ketone) of the present invention can be described as a product produced by any process described herein capable of producing the poly(β-thioether ketone) and can be further described as being produced using any embodiments of the processes described herein.

Poly(β-Thioether Nitrile) Compositions

In an aspect, a polymer of the present invention can be called a poly(β-thioether nitrile). The poly(β-thioether nitrile) of the present invention comprise multiple groups having structure G5:

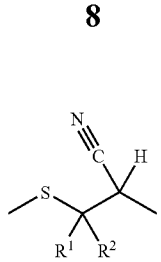

where each $R^1$ and $R^2$ can be H, an organyl group, or a hydrocarbyl group and the undesignated valencies represent the remainder of the structure of the polymer including additional groups having structure G2. In embodiments, the backbone of the poly(β-thioether nitrile) is linear; or alternatively, the backbone of the poly(β-thioether nitrile) is crosslinked. In some embodiments, each $R^1$ and $R^2$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$ and $R^2$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group.

The poly(β-thioether nitrile) of the present invention can alternatively be described as a polymer produced from a thiol ester composition and an α,β-unsaturated nitrile composition. The thiol ester composition and the α,β-unsaturated nitrile composition are independent elements of the poly(β-thioether ketone). Therefore, the poly(β-thioether nitrile) can be described as a poly(β-thioether nitrile) produced from any combination of the thiol ester composition element described herein and the α,β-unsaturated nitrile composition element described herein.

In embodiments, the poly(β-thioether nitrile) of the present invention can be described as a product produced by any process described herein capable of producing the poly(β-thioether nitrile) and can be further described as being produced using any embodiments of the processes described herein.

Process of Making a Polymer Composition

Generally, the polymers of the present invention can be produced by contacting a thiol ester composition with an α,β-unsaturated ester composition, an α,β-unsaturated amide composition, an α,β-unsaturated ketone composition, an α,β-unsaturated nitrile composition, or any combination thereof. In some embodiments, the polymers of the invention can be produced by contacting a thiol ester composition with an α,β-unsaturated ester composition; alternatively, by contacting a thiol ester composition with an α,β-unsaturated amide composition; alternatively, by contacting a thiol ester composition with an α,β-unsaturated ketone composition; or alternatively, by contacting a thiol ester composition with an α,β-unsaturated nitrile composition. As an example, the polymers can be produced by the Michael addition reaction, as understood by those persons having ordinary skill in the art.

Process of Making a Poly(β-thioether Ester) Composition

In an aspect, a poly(β-thioether ester) of the present invention are produced by contacting a thiol ester composition and an α,β-unsaturated ester composition. In an embodiment, the poly(β-thioether ester) of the present invention can be produced by contacting the thiol ester composition and the α,β-unsaturated ester composition to produce a mixture and curing the mixture to produce the poly(β-thioether ester). In other embodiments, the mixture can be cured at ambient temperature, or the reactants can be combined at temperatures suitable to support the curing. Curing of such products can be conducted according to methods known in the art.

Generally, the thiol ester composition can be any thiol ester composition described herein. In embodiments, the thiol ester composition can be a mercaptanized unsaturated ester composition; alternatively, a mercaptanized epoxidized ester composition; alternatively, a hydroxy thiol ester composition; or alternatively, a cross-linked thiol ester composition. Besides the thiol ester compositions described herein, other suitable thiol ester compositions will be apparent to those persons having ordinary skill in the art, can be used, and are to be considered within the scope of the present invention.

Generally, the α,β-unsaturated ester composition can comprise, singly or in any combination, any α,β-unsaturated ester described herein. In embodiments, the α,β-unsaturated ester composition can comprise an acrylate, a methacrylate, or a mixture of acrylates and methacrylates. In some embodiments, the α,β-unsaturated ester composition can comprise an acrylate; or alternatively, a methacrylate. Generally, the acrylate(s) and/or methacrylate(s) comprising the α,β-unsaturated ester composition can comprise, either singly or in any combination, any acrylate and/or methacrylate disclosed herein.

The thiol ester composition and the α,β-unsaturated ester composition are supplied at a molar ratio of —SH groups of the thiol ester composition to acrylate groups of the α,β-unsaturated ester composition that ranges from 0.9 to 1.3.

In embodiments, a catalyst is included in forming the thiol ester/α,β-unsaturated ester mixture. Generally, the catalyst can be any amine. In some embodiments, the catalyst is a primary amine; alternatively, a secondary amine; or alternatively, a tertiary amine. In some amine catalyst embodiments, the catalyst can be 1,8-diazabicyclo[5,4,0]undec-7-ene [DBU-CAS# 6674-22-2], 1,4-diazabicyclo[2.2.2]octane [DABCO-CAS# 280-57-9], triethylamine (TEA), or dimethylbenzylamine (DMBA). In other amine catalyst embodiments, the catalyst can be 1,8-diazabicyclo[5,4,0]undec-7-ene [DBU-CAS# 6674-22-2]; alternatively, 1,4-diazabicyclo[2.2.2]octane [DABCO-CAS# 280-57-9]); alternatively, triethylamine; or alternatively, benzyldimethyl amine. In other embodiments, the catalyst can be an alkyltin compounds (i.e. alkyltincarboxylates such as . dibutyltindilaurate and dibutyltindiacetate). In some aspects, the catalyst can be phosphine (e.g. triphenylphosphine and triethylphosphine), caustic (e.g. sodium hydroxide and potassium hydroxide), or a caustic tergitol-type catalyst. Other suitable catalysts will be apparent to those of skill in the art and are to be considered within the scope of the present invention.

Generally, the thiol ester/α,β-unsaturated ester mixture is cured at any temperature that can produce the poly(β-thioether ester). In embodiments, the thiol ester/α,β-unsaturated ester mixture is cured at a temperature ranging from 50° C. to 100° C.

In some embodiments, the poly(β-thioether ester) that is produced according to methods described herein can have a glass transition temperature ranging between −100° C. and 250° C. In some aspects, the glass transition temperature ranges from −50° C. to 200° C.; alternatively, from 0° C. to 150° C.; alternatively, from 50° C. to 100° C.; or alternatively, from −50° C. to 50° C. In some aspects, the glass transition temperature ranges from −50° C. to 0° C.; alternatively, from 0° C. to 50° C.; alternatively, from 50° C. to 100° C.; alternatively, from 100° C. to 150° C.; alternatively, from 150° C. to 200° C.

Process of Making a Poly(β-Thioether Amide) Composition

In an aspect, the poly(β-thioether amide) of the present invention are produced by contacting a thiol ester composition and an α,β-unsaturated amide composition. In an embodiment, the poly(β-thioether amide) of the present invention can be produced by contacting the thiol ester composition and the α,β-unsaturated amide composition to produce a mixture and curing the mixture to produce the poly(β-thioether amide). In other embodiments, the mixture can be cured at ambient temperature, or the reactants can be combined at temperatures suitable to support the curing. Curing of such products can be conducted according to methods known in the art.

Generally, the thiol ester composition can be any thiol ester composition described herein. In embodiments, the thiol ester composition can be a mercaptanized unsaturated ester composition; alternatively, a mercaptanized epoxidized ester composition; alternatively, a hydroxy thiol ester composition; or alternatively, a cross-linked thiol ester composition.

Generally, the α,β-unsaturated amide composition can comprise, singly or in any combination, any α,β-unsaturated amide described herein. In embodiments, the α,β-unsaturated amide composition can comprise an acrylamide, a methacrylamide, or a mixture of acrylamides and methacrylamides. In some embodiments, the α,β-unsaturated amide composition can comprise an acrylamide; or alternatively, a methacrylamide. Generally, the acrylamide(s) and/or methacrylamide(s) comprising the α,β-unsaturated amide composition can comprise, either singly or in any combination, any acrylamide and/or methacrylamide disclosed herein.

The thiol ester composition and the α,β-unsaturated amide composition are supplied at a molar ratio of —SH groups of the thiol ester composition to acrylamide groups of the α,β-unsaturated amide composition that ranges from 0.9 to 1.3.

In embodiments, a catalyst is included in forming the thiol ester/α,β-unsaturated amide mixture. Generally, the catalyst can be any amine. In some embodiments, the catalyst is a primary amine; alternatively, a secondary amine; or alternatively, a tertiary amine. In some embodiments, the catalyst is DBU.

Generally, the thiol ester/α,β-unsaturated amide mixture is cured at any temperature that can produce the poly(β-thioether amide). In embodiments, the thiol ester/α,β-unsaturated amide mixture is cured at a temperature ranging from 50° C. to 100° C.

In some embodiments, the poly(β-thioether amide) that is produced according to methods described herein can have a glass transition temperature ranging between −100° C. and 250° C. In some aspects, the glass transition temperature ranges from −50° C. to 200° C.; alternatively, from 0° C. to 150° C.; or alternatively, from 50° C. to 100° C. In some aspects, the glass transition temperature ranges from −50° C. to 0° C.; alternatively, from 0° C. to 50° C.; alternatively, from 50° C. to 100° C.; alternatively, from 100° C. to 150° C.; alternatively, from 150° C. to 200° C.

Process of Making a Poly(β-Thioether Ketone) Composition

In an aspect, the poly(β-thioether ketone) of the present invention are produced by contacting the thiol ester composition and the α,β-unsaturated ketone composition. In an embodiment, the poly(β-thioether ketone) of the present invention can be produced by contacting the thiol ester composition and the α,β-unsaturated ketone composition to produce a mixture and curing the mixture to produce the poly(β-thioether ketone). In other embodiments, the mixture can be cured at ambient temperature, or the reactants can be combined at temperatures suitable to support the curing. Curing of such products can be conducted according to methods known in the art.

Generally, the thiol ester composition can be any thiol ester composition described herein. In embodiments, the thiol ester composition can be a mercaptanized unsaturated ester composition; alternatively, a mercaptanized epoxidized ester composition; alternatively, a hydroxy thiol ester composition; or alternatively, a cross-linked thiol ester composition. Generally, the α,β-unsaturated ketone composition can comprise, singly or in any combination, any α,β-unsaturated ketone described herein.

The thiol ester composition and the α,β-unsaturated ketone composition are supplied at a molar ratio of the thiol ester composition to the α,β-unsaturated ketone composition that ranges from 0.9 to 1.3.

In embodiments, a catalyst is included in forming the thiol ester/α,β-unsaturated ketone mixture. Generally, the catalyst can be any amine. In some embodiments, the catalyst is a primary amine; alternatively, a secondary amine; or alternatively, a tertiary amine. In some embodiments, the catalyst is DBU.

Generally, the thiol ester/α,β-unsaturated ketone mixture is cured at any temperature that can produce the poly(β-thioether ketone). In embodiments, the thiol ester/α,β-unsaturated ketone mixture is cured at a temperature ranging from 50° C. to 100° C.

In some embodiments, the poly(β-thioether ketone) that is produced according to methods described herein can have a glass transition temperature ranging between −100° C. and 250° C. In some aspects, the glass transition temperature ranges from −50° C. to 200° C.; alternatively, from 0° C. to 150° C.; or alternatively, from 50° C. to 100° C. In some aspects, the glass transition temperature ranges from −50° C. to 0° C.; alternatively, from 0° C. to 50° C.; alternatively, from 50° C. to 100° C.; alternatively, from 100° C. to 150° C.; alternatively, from 150° C. to 200° C.

Process of Making a Poly(β-Thioether Nitrile) Composition

In an aspect, the poly(β-thioether nitrile) of the present invention are produced by contacting the thiol ester composition and the α,β-unsaturated nitrile composition. In an embodiment, the poly(β-thioether nitrile) of the present invention can be produced by contacting the thiol ester composition and the α,β-unsaturated nitrile composition to produce a mixture and curing the mixture to produce the poly(β-thioether nitrile). In other embodiments, the mixture can be cured at ambient temperature, or the reactants can be combined at temperatures suitable to support the curing. Curing of such products can be conducted according to methods known in the art.

Generally, the thiol ester composition can be any thiol ester composition described herein. In embodiments, the thiol ester composition can be a mercaptanized unsaturated ester composition; alternatively, a mercaptanized epoxidized ester composition; alternatively, a hydroxy thiol ester composition; or alternatively, a cross-linked thiol ester composition. Generally, the α,β-unsaturated nitrile composition can comprise, singly or in any combination, any α,β-unsaturated nitrile described herein.

The thiol ester composition and the α,β-unsaturated nitrile composition are supplied at a molar ratio of the thiol ester composition to the α,β-unsaturated nitrile composition that ranges from 0.9 to 1.3.

In embodiments, a catalyst is included in forming the thiol ester/α,β-unsaturated nitrile mixture. Generally, the catalyst can be any amine. In some embodiments, the catalyst is a primary amine; alternatively, a secondary amine; or alternatively, a tertiary amine. In some embodiments, the catalyst is DBU.

Generally, the thiol ester/α,β-unsaturated nitrile mixture is cured at any temperature that can produce the poly(β-thioether nitrile). In embodiments, the thiol ester/α,β-unsaturated nitrile mixture is cured at a temperature ranging from 50° C. to 100° C.

In some embodiments, the poly(β-thioether nitrile) that is produced according to methods described herein can have a glass transition temperature ranging between −100° C. and 250° C. In some aspects, the glass transition temperature ranges from −50° C. to 200° C.; alternatively, from 0° C. to 150° C.; or alternatively, from 50° C. to 100° C. In some aspects, the glass transition temperature ranges from −50° C. to 0° C.; alternatively, from 0° C. to 50° C.; alternatively, from 50° C. to 100° C.; alternatively, from 100° C. to 150° C.; alternatively, from 150° C. to 200° C.

Feedstocks

Thiol Ester Composition

The thiol ester composition used as a feedstock to produce the polymers described herein can be described using a number of different methods. Functionally, the thiol ester can be described by the type of functional groups present in the thiol ester. In this functional description, the thiol ester composition minimally contains molecules having at least one ester group and at least one thiol group. In other embodiments, the thiol ester composition can include thiol esters with and without additional groups, such as hydroxy groups, and/or polysulfide linkages —$S_x$— wherein x is an integer greater than 1. When the thiol ester contains the hydroxy group, the thiol ester is referred to as a hydroxy thiol ester. When the thiol ester has a polysulfide linkages —$S_x$— wherein x is an integer greater than 1, the thiol ester can be referred to as a crosslinked thiol ester. When the thiol ester has an hydroxy group and a polysulfide group —$S_x$— wherein x is an integer greater than 1, the thiol ester can be referred to as crosslinked hydroxy thiol ester.

Alternatively, the thiol ester can be described using a name that indicates the method by which it was formed. For example, a thiol ester referred to as a mercaptanized unsaturated ester refers to a thiol ester produced by reacting hydrogen sulfide with an unsaturated ester. The mercaptanized unsaturated ester can be further described utilizing the functional descriptors of the thiol esters present in the mercaptanized unsaturated ester. For example, in two non-limiting examples, a mercaptanized soybean oil can be further described by a combination of the number of ester groups and the number of thiol groups among others thiol ester aspects present in the mercaptanized soybean oil, while a mercaptanized castor oil can be further described by a combination of the number of ester group, number of thiol groups, the number of hydroxy groups, among other thiol ester aspects present in the mercaptanized castor oil.

In an aspect, the thiol ester composition of the present invention can be produced by reacting any unsaturated ester with hydrogen sulfide, as described in U.S. patent application Ser. Nos. 11/060,675; 11/060,696; 11/059,792; and 11/059,647 (hereinafter "the '675 Applications"), the disclosure of which is incorporated by reference in its entirety. When the thiol ester composition is produced by reacting an unsaturated ester with hydrogen sulfide, the material produced can be referred to as the mercaptanized unsaturated ester. Because the unsaturated esters can contain multiple carbon-carbon double bonds per unsaturated ester molecule, carbon-carbon double bond reactivity and statistical probability dictate that each thiol ester molecule of the feedstock thiol ester composition produced from the unsaturated ester composition will not have the same number of thiol groups, number of unreacted carbon-carbon double bonds, number of cyclic sulfides, molar ratio of carbon-carbon double bonds to thiol groups, molar ratio of cyclic sulfides to thiol groups, and/or other quantities of functional groups and molar ratios disclosed herein as the unsaturated ester. Additionally, the unsaturated esters can also comprise a mixture of individual unsaturated esters having a different number of carbon-carbon double bonds and/or ester groups. Thus, many of these properties will be described as an average number of groups per thiol ester molecule within the thiol ester composition or average ratio per thiol ester molecule within the thiol ester composition. In other embodiments, it is desired to control the thiol sulfur content present in the thiol ester. Because it is difficult to ensure that the hydrogen sulfide reacts with every carbon-carbon double bond within the unsaturated ester, certain molecules of thiol ester can have more or less thiol groups than other molecules. Thus, the weight percent of thiol groups is stated as an average across all thiol ester molecules of the thiol ester composition.

When the thiol ester is cross-linked, the thiol ester is referred to as a cross-linked thiol ester or a cross-linked hydroxy thiol ester, depending upon the compositions used to produce the cross-linked thiol ester. Each of these types of thiol ester compositions are described herein. Hydroxy thiol esters, cross-linked hydroxy thiol esters, mercaptanized unsaturated esters, mercaptanized epoxidized esters, cross-linked mercaptanized unsaturated esters, and cross-linked mercaptanized epoxidized esters are all considered to be thiol ester compositions. Many of the same attributes that are used to describe the thiol ester compositions, such as the molar ratios and other independent descriptive elements described herein, are equally applicable to many of the different types of thiol ester compositions described herein.

Generally, the thiol ester compositions can be described as comprising one or more separate or discreet functional groups of the thiol ester molecule and/or thiol ester composition. These independent functional groups can include: the number of (or average number of) ester groups per thiol ester molecule, the number of (or average number of) thiol groups per thiol ester molecule, the number of (or average number of) unreacted carbon-carbon double bonds per thiol ester molecule, the average thiol sulfur content of the thiol ester composition, the percentage (or average percentage) of sulfide linkages per thiol ester molecule, and the percentage (or average percentage) of cyclic sulfide groups per thiol ester molecule. Additionally, the thiol ester compositions can be described using individual or a combination of ratios including the ratio of double bonds to thiol groups, the ratio of cyclic sulfides to mercaptan groups, and the like. As separate elements, these functional groups of the thiol composition will be described separately.

Minimally, the thiol ester contains thiol ester molecules having at least one ester group and one thiol group per thiol ester molecule. In embodiments, the thiol ester can be prepared from unsaturated esters. Therefore, in some embodiments, the thiol ester can contain the same number of ester groups as the unsaturated esters from which they are prepared, as described herein. In an embodiment, the thiol ester molecules can have an average of at least 1.5 ester groups per thiol ester molecule. Alternatively, the thiol ester molecules can have an average of at least 2 ester groups per thiol ester molecule; alternatively, an average of at least 2.5 ester groups per thiol ester molecule; or alternatively, an average of at least 3 ester groups per thiol ester molecule. In other embodiments, the thiol esters can have an average of from 1.5 to 8 ester groups per thiol ester molecule; alternatively, an average of from 2 to 7 ester groups per thiol ester molecule; alternatively, an average of from 2.5 to 5 ester groups per thiol ester molecule; or alternatively, an average of from 3 to 4 ester groups per thiol ester molecule. In yet other embodiments, the thiol ester can comprise an average of about 3 ester groups per thiol ester molecule or alternatively, an average of about 4 ester groups per thiol ester molecule.

Minimally, the thiol ester comprises one or an average of at least one thiol group per thiol ester molecule. In an embodiment, the thiol ester molecules can have an average of at least 1.5 thiol groups per thiol ester molecule; alternatively, an average of at least 2 thiol groups per thiol ester molecule; alternatively, an average of at least 2.5 thiol groups per thiol ester molecule; or alternatively, an average of at least 3 thiol groups per thiol ester molecule. In other embodiments, the thiol ester molecules can have an average of from 1.5 to 9 thiol groups per thiol ester molecule; alternatively, an average of from 3 to 8 thiol groups per thiol ester molecule; alternatively, an average of from 2 to 4 thiol groups per thiol ester molecule; or alternatively, an average of from 4 to 8 thiol groups per thiol ester molecule.

In an aspect, the thiol ester can be described using the number of thiol groups present in the thiol ester. For example, a thiol ester referred to as a trimercaptan thiol ester can be a thiol ester containing an average of between 2.5 to 3.5 thiol groups per thiol ester molecule. Alternatively, the trimercaptan thiol ester can contain an average of between 2.75 to 3.25 thiol groups per thiol ester molecule. As another example, a thiol ester referred to as a dimercaptan thiol ester can be a thiol ester containing an average of between 1.5 to 2.5 thiol groups per thiol ester molecule; or alternatively, between 1.75 and 2.25 thiol groups per thiol ester molecule.

In other embodiments, the thiol ester can be further described by the average amount of thiol sulfur present in the thiol ester. In an embodiment, the thiol ester molecules have an average of at least 5 weight percent thiol sulfur per thiol ester molecule; alternatively, an average of at least 10 weight percent thiol sulfur per thiol ester molecule; or alternatively, an average of greater than 15 weight percent thiol sulfur per thiol ester molecule. In an embodiment, the thiol ester molecules have an average of from 5 to 25 weight percent thiol sulfur per thiol ester molecule; alternatively, an average of from 5 to 20 weight percent thiol sulfur per thiol ester molecule; alternatively, an average of from 6 to 15 weight percent thiol sulfur per thiol ester molecule; or alternatively, an average of from 8 to 10 weight percent thiol sulfur per thiol ester molecule.

Generally, the location of the thiol group of the thiol ester is not particularly important and will be dictated by the method used to produce the thiol ester. In embodiments wherein the thiol ester is produced by contacting an unsaturated ester with hydrogen sulfide (a mercaptanized unsaturated ester), the position of the thiol group will be dictated by the position of the carbon-carbon double bond. When the carbon-carbon double bond is an internal carbon-carbon double bond, the method of producing the thiol ester will result in a secondary thiol group. But when the double bond is located at a terminal position, it is possible to choose reaction conditions to produce a thiol ester comprising either a primary thiol group or a secondary thiol group.

Some methods of producing the thiol ester composition can additionally create sulfur containing functional groups other than a thiol group. For example, in some thiol ester production methods, an introduced thiol group can react with a carbon-carbon double bond within the same unsaturated ester to produce a sulfide linkage. When the reaction is with a double bond of a second unsaturated ester, a simple sulfide linkage is produced. In some instances, the second carbon-carbon double bond is located in the same unsaturated ester molecule. When the thiol group reacts with a second carbon-carbon double bond within the same unsaturated ester molecule, a sulfide linkage is produced. In some instances, the carbon-carbon double bond can be within a second ester group of the unsaturated ester molecule. While in other instances, the carbon-carbon double bond can be within the same ester group of the unsaturated ester molecule.

When the thiol group reacts with the carbon-carbon double bond in a second ester group of the same unsaturated ester molecule, the sulfide contains at least one ester group within a ring structure. In some embodiments when the thiol group reacts with the carbon-carbon double bond in a second ester group of the same unsaturated ester molecule, the sulfide contains two ester groups within a ring structure. Within this specification, the first type of sulfide containing an ester group within the ring structure is referred to as a simple sulfide. When the thiol group reacts with the carbon-carbon double bond within the same ester group, the sulfide does not contain an ester group within the ring structure. Within this specification, this second type of sulfide is referred to as a cyclic sulfide. In the cyclic sulfide case, the sulfide linkage produces a cyclic sulfide functionality within a single ester group of the thiol ester. The cyclic sulfide rings that can be produced include a tetrahydrothiopyran ring, a thietane ring, or a thiophane ring (tetrahydrothiophene ring).

In some embodiments, it is desirable to control the average amount of sulfur present as cyclic sulfide in the thiol ester. In an embodiment, the average amount of sulfur present as cyclic sulfide in the thiol ester molecules comprises less than 30 mole percent. Alternatively, the average amount of sulfur present as cyclic sulfide in the thiol esters can comprise less than 20 mole percent; alternatively, less than 10 mole percent; alternatively, less than 5 mole percent; or alternatively, less than 2 mole percent. In other embodiments, it is desirable to control the molar ratio of cyclic sulfides to thiol groups. In an embodiment, the average molar ratio of cyclic sulfide groups to thiol group per thiol ester can be less than 1.5. Alternatively, the average molar ratio of cyclic sulfide groups to thiol group per thiol ester can be less than 1; alternatively, less than 0.5; alternatively, less than 0.25; or alternatively, less than 0.1. In some embodiments, the ratio of cyclic sulfide groups to thiol group per thiol ester can range from 0 to 1; or alternatively, the average molar ratio of cyclic sulfide groups to thiol group per thiol ester can range between 0.05 and 1.

In some instances it is desirable to have carbon-carbon double bonds present in the thiol ester composition, while in other embodiments it can be desirable to minimize the number of carbon-carbon double bonds present in the thiol ester composition. The presence of carbon-carbon double bonds in the thiol ester can be stated as an average molar ratio of carbon-carbon double bonds to thiol-sulfur. In an embodiment, the average ratio of the remaining unreacted carbon-carbon double bond in the thiol ester composition to thiol sulfur can be less than 1.5 per thiol ester molecule. Alternatively, the average ratio of carbon-carbon double bond to thiol sulfur can be less than 1.2 per thiol ester molecule; alternatively, less than 1.0 per thiol ester molecule; alternatively, less than 0.75 per thiol ester molecule; alternatively, less than 0.5 per thiol ester molecule; alternatively, less than 0.2 per thiol ester molecule; or alternatively, less than 0.1 per thiol ester molecule.

In particular embodiments, the thiol ester is produced from unsaturated ester compositions (a mercaptanized unsaturated ester). Because the unsaturated ester has particular compositions having a certain number of ester groups present, the product thiol ester composition will have about the same number of ester groups per thiol ester molecule as the unsaturated ester. Other, independent thiol ester properties are described herein can be used to further describe the thiol ester composition.

In an aspect, the thiol ester can be referred to as a mercaptanized unsaturated ester. In these embodiments, the unsaturated ester described herein and/or the unsaturated ester functional descriptions described herein can be utilized to further indicate and/or further describe a particular mercaptanized ester. In a few non-limiting examples, the thiol ester produced by contacting a natural source oil with hydrogen sulfide can be referred to as mercaptanized natural source oil, the thiol ester produced by contacting a soybean oil with hydrogen sulfide can be referred to as mercaptanized soybean oil, and the thiol ester produced by contacting a castor oil with hydrogen sulfide can be referred to as mercaptanized castor oil. Additional properties of the unsaturated ester oils described herein can also be utilized to further describe the unsaturated ester oil and the mercaptanized ester oil.

In some embodiments, the thiol ester molecules are produced from unsaturated esters having an average of less than 25 weight percent of side chains having 3 contiguous methylene interrupted carbon-carbon double bonds, as described herein. In some embodiments, greater than 40 percent of the thiol ester molecule total side chains can include sulfur. In some embodiments, greater than 60 percent of the thiol ester molecule total side chains can include sulfur. In other embodiments, greater than 50, 70, or 80 percent of the thiol ester molecule total side chains can include sulfur.

In an embodiment, the thiol ester is a thiol containing natural source oil, as described herein. When the thiol ester is a thiol containing natural source oil, functional groups that are present in the thiol containing natural source oil can be described in a "per thiol ester molecule" basis or in a "per triglyceride" basis. The thiol containing natural source oil can have substantially the same properties as the thiol ester composition, such as the molar ratios and other independent descriptive elements described herein.

The average number of thiol groups per triglyceride in the thiol containing natural source oil is greater than about 1.5. In some embodiments, the average number of thiol groups per triglyceride can range from about 1.5 to about 9.

The mercaptanized unsaturated ester composition can also be described as a product produced by the process comprising contacting hydrogen sulfide and an unsaturated ester composition. In other words, the unsaturated ester composition is mercaptanized to form the mercaptanized unsaturated ester composition. The mercaptanized unsaturated ester composition can also be described using a molecular weight or an average molecular weight of the side chains. All of the attributes used to describe the thiol ester composition can be used to describe the mercaptanized unsaturated ester composition.

Hydroxy Thiol Ester Composition

In an aspect, the thiol ester composition used as a feedstock to produce the polymers described herein can be a hydroxy thiol ester. The hydroxy thiol ester can be described using a number of methods. Functionally, the hydroxy thiol ester can be described by the types of functional group present in the hydroxy thiol ester. In this functional description, the hydroxy thiol ester composition minimally contains molecules having at least one ester group, at least one thiol group, and at least one hydroxy group. In other embodiments, the hydroxy thiol ester composition can include other functional groups. For example the hydroxy thiol ester can also include polysulfide linkages —$S_x$— wherein x is an integer greater than 1. When the thiol ester has an hydroxy group and a polysulfide group —$S_x$— wherein x is an integer greater than 1, the thiol ester can be referred to as crosslinked hydroxy thiol ester.

Alternatively, the hydroxy thiol ester can be described using a name that indicates the method by which it was formed. For example, a hydroxy thiol ester that is called a mercaptanized epoxidized ester refers to a hydroxy thiol ester produced by reacting hydrogen sulfide with an epoxidized unsaturated ester. The mercaptanized epoxidized ester can be further described utilizing functional group descriptor(s) of the groups present in the mercaptanized epoxidized ester. For example, a hydroxy thiol ester produced by reacting hydrogen sulfide with a mercaptanized epoxidized ester will produce an α-hydroxy thiol group and the mercaptanized epoxidized ester may be called an α-hydroxy thiol ester or be described as containing α-hydroxy thiol groups. Compounds that fit the hydroxy thiol ester composition description do not always fit the mercaptanized epoxidized ester description or the α-hydroxy thiol ester description. For example, mercaptanized castor oil can be described using some of the hydroxy thiol ester definitions by virtue of having at least one ester group, at least one thiol group, and at least one hydroxy group. Mercaptanized castor oil is not a mercaptanized epoxidized ester because it is produced by contacting castor oil, which contains hydroxy groups, with hydrogen sulfide and not by reacting hydrogen sulfide with epoxidized castor oil. However, mercaptanized castor oil is a mercaptanized epoxidized ester oil by virtue of its formation by contacting hydrogen sulfide with epoxidized castor oil.

The feedstock thiol ester compositions can also contain a hydroxy or alcohol group. When the thiol ester composition includes the hydroxy group, the thiol ester composition is referred to herein as the hydroxy thiol ester composition. The quantity or number of alcohol groups present in the hydroxy thiol ester composition can be independent of the quantity of other functional groups present in the hydroxy thiol ester composition (e.g. thiol groups, ester groups, sulfides, cyclic sulfides, etc.). Additionally, the weight percent of thiol sulfur and functional group ratios (e.g. molar ratio of cyclic sulfides to thiol groups, molar ratio of epoxide groups to thiol groups, molar ratio of epoxide groups to α-hydroxy thiol groups and other disclosed quantities of functional groups and their molar ratios to the thiol groups) are separate or discreet elements that can be used to describe the hydroxy thiol ester composition. The hydroxy thiol ester composition can be described using any combination of the hydroxy thiol ester composition separate functional groups or ratios described herein.

In an embodiment, the hydroxy thiol ester composition can be produced by reacting hydrogen sulfide with an epoxidized unsaturated ester composition as described in the '675 Applications. When the thiol ester composition is produced by reacting hydrogen sulfide with an epoxidized unsaturated ester, the material produced can be called a mercaptanized epoxidized ester. Because the epoxidized unsaturated ester can contain multiple epoxide groups, epoxide group reactivity and statistical probability dictate that not all hydroxy thiol ester molecules of the hydroxy thiol ester composition will have the same number of hydroxy groups, thiol groups, α-hydroxy thiol groups, sulfides, cyclic sulfides, molar ratio of cyclic sulfides to thiol groups, molar ratio of epoxide groups to thiol groups, molar ratio of epoxide groups to α-hydroxy thiol groups, weight percent thiol sulfur, and/or other disclosed quantities of functional groups and their molar ratios in the epoxidized unsaturated ester composition. Thus, many of these properties will be discussed as an average number or ratio per hydroxy thiol ester molecule. In other embodiments, it is desired to control the content of thiol sulfur present in the hydroxy thiol ester. Because it is difficult to ensure that the hydrogen sulfide reacts with every epoxide group within the epoxidized unsaturated ester, certain hydroxy thiol ester molecules can have more or less thiol groups than other molecules within the hydroxy thiol ester composition. Thus, the weight percent of thiol groups can be stated as an average weight percent across all hydroxy thiol ester molecules.

As an embodiment of the present invention, the hydroxy thiol ester composition includes hydroxy thiol ester molecules that have an average of at least 1 ester group and an average of at least 1 α-hydroxy thiol group per hydroxy thiol ester molecule. As an embodiment of the present invention, the hydroxy thiol ester composition includes hydroxy thiol ester molecules that have an average of at least 1.5 ester groups and an average of at least 1.5 α-hydroxy thiol groups per hydroxy thiol ester molecule.

Alternatively, in some embodiments, the hydroxy thiol ester comprises at least one ester, at least one thiol group, and at least one hydroxy group. Thus, in some embodiments, the hydroxy thiol ester composition includes hydroxy thiol ester molecules that have an average of at least 1.5 ester groups, an average of at least 1.5 thiol groups, and an average of at least 1.5 hydroxy groups per hydroxy thiol molecule.

In embodiments, the hydroxy thiol ester can be prepared from the epoxidized unsaturated ester or the unsaturated ester. Thus, the hydroxy thiol ester can contain the same number of ester groups as the epoxidized unsaturated ester or unsaturated ester. In an embodiment, the hydroxy thiol ester molecules have an average of at least 1.5 ester groups per hydroxy thiol ester molecule. Alternatively, the hydroxy thiol ester molecules have an average of at least 2 ester groups per hydroxy thiol ester molecule; alternatively, an average of at least 2.5 ester groups per hydroxy thiol ester molecule; or alternatively, an average of at least 3 ester groups per hydroxy thiol ester molecule. In other embodiments, the hydroxy thiol esters have an average of from 1.5 to 8 ester groups per hydroxy thiol ester molecule; alternatively, an average of from 2 to 7 ester groups per hydroxy thiol ester molecule; alternatively, an average of from 2.5 to 5 ester groups per hydroxy thiol ester molecule; or alternatively, an average of from 3 to 4 ester groups per hydroxy thiol ester molecule. In yet other embodiments, the α-hydroxy thiol ester comprises an average of 3 ester groups per hydroxy thiol ester molecule; or alternatively, an average of 4 ester groups per hydroxy thiol ester molecule.

In some embodiments, the hydroxy group and the thiol group are combined in the same group (i.e. when the hydroxy thiol ester is produced from the epoxidized unsaturated ester), the group can be referred to as an α-hydroxy thiol group. In other embodiments, the thiol group and the hydroxy or alcohol group are not in the same group (i.e. when the hydroxy thiol ester is produced from an unsaturated ester comprising hydroxy groups such as castor oil). In this instance, the presence of the alcohol group is not dependent upon the formation of the thiol group. For example, as another embodiment of the present invention, the hydroxy thiol ester composition includes hydroxy thiol ester molecules. The hydroxy thiol ester molecules have an average of at least 1.5 ester groups, an average of at least 1.5 thiol groups, and an average of at least 1.5 alcohol groups per hydroxy thiol ester molecule.

Minimally, in some embodiments, the hydroxy thiol ester comprises at least one thiol group per hydroxy thiol ester molecule. In an embodiment, the hydroxy thiol ester molecules can have an average of at least 1.5 thiol groups per hydroxy thiol ester molecule; alternatively, an average of at least 2 thiol groups per hydroxy thiol ester molecule; alternatively, an average of at least 2.5 thiol groups per hydroxy thiol ester molecule; or alternatively, an average of at least 3 thiol groups per hydroxy thiol ester molecule. In other embodiments, the hydroxy thiol ester molecules can have an average of from 1.5 to 9 thiol groups per hydroxy thiol ester molecule; alternatively, an average of from 3 to 8 thiol groups per hydroxy thiol ester molecule; alternatively, an average of from 2 to 4 thiol groups per hydroxy thiol ester molecule; or alternatively, an average of from 4 to 8 thiol groups per hydroxy thiol ester.

Minimally, in some embodiments, the hydroxy thiol ester composition comprises an average of at least 1 hydroxy or alcohol group per hydroxy thiol ester molecule. In some embodiments, the hydroxy thiol ester composition can have an average of at least 1.5 hydroxy groups per hydroxy thiol ester molecule; alternatively, an average of at least 2 hydroxy groups per hydroxy thiol ester molecule; alternatively, an average of at least 2.5 hydroxy groups per hydroxy thiol ester molecule; or alternatively, an average of at least 3 hydroxy groups per hydroxy thiol ester molecule. In other embodiments, the thiol ester composition can have an average of from 1.5 to 9 hydroxy groups per hydroxy thiol ester molecule; alternatively, an average of from 3 to 8 hydroxy groups per hydroxy thiol ester molecule; alternatively, an average of from 2 to 4 hydroxy groups per hydroxy thiol ester molecule; or alternatively, an average of from 4 to 8 hydroxy groups per hydroxy thiol ester molecule.

In yet other embodiments, the number of hydroxy groups can be stated as an average molar ratio of hydroxy groups to thiol groups. Minimally, in some embodiments, the molar ratio of hydroxy groups to thiol groups can be at least 0.25. In some embodiments, the molar ratio of hydroxy groups to thiol groups can be at least 0.5; alternatively, at least 0.75; alternatively, at least 1.0; alternatively, at least 1.25; or alternatively, at least 1.5. In other embodiments, the molar ratio of hydroxy groups to thiol groups can range from 0.25 to 2.0; alternatively, from 0.5 to 1.5; or alternatively, from 0.75 to 1.25.

In embodiments where the hydroxy thiol esters are produced from an epoxidized unsaturated ester, the hydroxy thiol esters can be described as containing ester groups and $\alpha$-hydroxy thiol groups. In this case, the hydroxy thiol esters that contain ester groups and $\alpha$-hydroxy thiol groups can be referred to as mercaptanized epoxidized esters. The number of ester groups and the number of $\alpha$-hydroxy thiol groups are independent elements and as such, the hydroxy thiol esters can be described as having any combination of ester groups and $\alpha$-hydroxy thiol groups described herein. Minimally, the hydroxy thiol ester can have an average of at least 1 $\alpha$-hydroxy thiol group per hydroxy thiol ester molecule. In some embodiments, the hydroxy thiol ester composition can have an average of at least 1.5 $\alpha$-hydroxy thiol groups per hydroxy thiol ester molecule; alternatively, an average of at least 2 $\alpha$-hydroxy thiol groups per hydroxy thiol ester molecule; alternatively, an average of at least 2.5 $\alpha$-hydroxy thiol groups per hydroxy thiol ester molecule; or alternatively, an average of at least 3 $\alpha$-hydroxy thiol groups per hydroxy thiol ester molecule. In other embodiments, the hydroxy thiol ester composition can have an average of from 1.5 to 9 $\alpha$-hydroxy thiol groups per hydroxy thiol ester molecule; alternatively, an average of from 3 to 8 $\alpha$-hydroxy thiol groups per hydroxy thiol ester molecule; alternatively, an average of from 2 to 4 $\alpha$-hydroxy thiol groups per hydroxy thiol ester molecule; or alternatively, an average of from 4 to 8 $\alpha$-hydroxy thiol groups per hydroxy thiol ester molecule.

In an aspect, the hydroxy thiol ester can be described using the number of thiol groups or hydroxy thiol groups present in the hydroxy thiol ester. For example, a hydroxy thiol ester referred to as a trimercaptan hydroxy thiol ester can be a hydroxy thiol ester containing an average of between 2.5 to 3.5 thiol or $\alpha$-hydroxy thiol groups per hydroxy thiol ester molecule. Alternatively, the trimercaptan hydroxy thiol ester can contain an average of between 2.75 to 3.25 thiol or $\alpha$-hydroxy thiol groups per hydroxy thiol ester molecule. As another example, a hydroxy thiol ester referred to as a dimercaptan hydroxy thiol ester can be a hydroxy thiol ester containing an average of between 1.5 to 2.5 thiol or $\alpha$-hydroxy thiol groups per hydroxy thiol ester molecule; or alternatively, between 1.75 and 2.25 thiol or $\alpha$-hydroxy thiol groups per hydroxy thiol ester molecule.

In another aspect, the hydroxy thiol ester can be described using the number of alcohol, $\alpha$-hydroxy thiol, or other functional groups present in the hydroxy thiol ester. For example, a hydroxy thiol ester referred to as a trifunctional hydroxy thiol ester can be a hydroxy thiol ester containing an average of between 2.5 to 3.5 alcohol, $\alpha$-hydroxy thiol, or other functional groups per hydroxy thiol ester molecule. Alternatively, the trifunctional hydroxy thiol ester can contain an average of between 2.75 to 3.25 alcohol, $\alpha$-hydroxy thiol, or other functional groups per hydroxy thiol ester molecule. As another example, a hydroxy thiol ester referred to as a difunctional hydroxy thiol ester can be a hydroxy thiol ester containing an average of between 1.5 to 2.5 alcohol, $\alpha$-hydroxy thiol, or other functional groups per hydroxy thiol ester molecule; or alternatively, between 1.75 and 2.25 alcohol, $\alpha$-hydroxy thiol, or other functional groups per hydroxy thiol ester molecule.

The hydroxy thiol esters can be produced by contacting an epoxidized ester derived from an unsaturated ester (i.e., epoxidized unsaturated ester) with hydrogen sulfide, as described herein. In some instances, it is desirable to have epoxide groups present in the hydroxy thiol ester composition. While in other embodiments, it can be desirable to minimize the number of epoxy groups present in the hydroxy thiol ester composition. Thus, the presence of residual epoxide groups can be another separate functional group used to describe the hydroxy thiol ester. The hydroxy thiol esters can include an average of greater than 0 to about 4 epoxide groups per triglyceride. The thiol composition can also include an average of greater than 1.5 to about 9 epoxide groups per triglyceride.

The presence of epoxide groups in the hydroxy thiol ester can be independently described as an average number of epoxide groups per hydroxy thiol ester, a molar ratio of epoxide groups to thiol groups, a molar ratio of epoxide groups to $\alpha$-hydroxy thiol groups, or any combination thereof. In some embodiments, the hydroxy thiol ester molecules can have an average of less than 2 epoxide groups per hydroxy thiol ester molecule, i.e., the hydroxy thiol ester molecules have a molar ratio of epoxide groups to $\alpha$-hydroxy thiol groups of less than 2. Alternatively, the hydroxy thiol ester can have an average of less than 1.5 epoxide groups per hydroxy thiol ester molecule; alternatively, an average of less than 1 epoxide group per hydroxy thiol ester molecule; alternatively, an average of less than 0.75 epoxide groups per hydroxy thiol ester molecule; or alternatively, an average of less than 0.5 epoxide groups per hydroxy thiol ester molecule. In other embodiments, the molar ratio of epoxide groups to thiol groups can average less than 1.5. Alternatively, the molar ratio of epoxide groups to thiol groups can average less than 1; alternatively, average less than 0.75; alternatively, average less than 0.5; alternatively, average less than 0.25; or alternatively, average less than 0.1. In yet other embodiments, the molar ratio of epoxide groups to $\alpha$-hydroxy thiol groups can average less than 1.5. Alternatively, the molar ratio of epoxide groups to α-hydroxy thiol groups can average less than 1; alternatively, average less than 0.75; alternatively, average less than 0.5; alternatively, average less than 0.25; or alternatively, average less than 0.1. In yet other embodiments, the hydroxy thiol ester composition is substantially free of epoxide groups.

In other embodiments, the hydroxy thiol ester can be described by the average amount of thiol sulfur present in the hydroxy thiol ester. In an embodiment, the hydroxy thiol ester molecules can have an average of at least 2.5 weight percent thiol sulfur per hydroxy thiol ester molecule; alternatively, an average of at least 5 weight percent thiol sulfur per hydroxy thiol ester molecule; alternatively, an average of at least 10 weight percent thiol sulfur per hydroxy thiol ester molecule; or alternatively, an average of greater than 15 weight percent thiol sulfur per hydroxy thiol ester molecule. In an embodiment, the hydroxy thiol ester molecules can have an average of from 5 to 25 weight percent thiol sulfur per hydroxy thiol ester molecule; alternatively, an average of from 5 to 20 weight percent thiol sulfur per hydroxy thiol ester molecule; alternatively, an average of from 6 to 15 weight percent thiol sulfur per hydroxy thiol ester molecule; or alternatively, an average of from 8 to 10 weight percent thiol sulfur per hydroxy thiol ester molecule.

In some embodiments when the hydroxy thiol ester can be described as an ester of a polyol and a hydroxy thiol carboxylic acid, at least 20 percent of the total side chains include a hydroxy group and a thiol group. In other embodiments when the hydroxy thiol ester can be described as an ester of a polyol and a hydroxy thiol carboxylic acid, at least 40 percent of the total side chains include a hydroxy group and a thiol group. In yet other embodiments when the hydroxy thiol ester can be described as an ester of a polyol and a hydroxy thiol carboxylic acid, at least 60 percent of the total side chains include a hydroxy group and a thiol group; or alternatively, at least 70 percent of the total side chains include the hydroxy group and a thiol group. Yet in further embodiments when the hydroxy thiol ester can be described as an ester of a polyol and a hydroxy thiol carboxylic acid, at least 80 percent of the total side chains include the hydroxy group and a thiol group.

In some embodiments when the hydroxy thiol ester can be described as an ester of a polyol and an α-hydroxy thiol carboxylic acid, at least 20 percent of the total side chains include the α-hydroxy thiol group. In other embodiments when the hydroxy thiol ester can be described as an ester of a polyol and an α-hydroxy thiol carboxylic acid, at least 40 percent of the total side chains include the α-hydroxy thiol group. In yet other embodiments when the hydroxy thiol ester can be described as an ester of a polyol and an α-hydroxy thiol carboxylic acid, at least 60 percent of the total side chains include the α-hydroxy thiol group; or alternatively, at least 70 percent of the total side chains include the α-hydroxy thiol group. Yet in further embodiments when the hydroxy thiol ester can be described as an ester of a polyol and an α-hydroxy thiol carboxylic acid, at least 80 percent of the total side chains include the α-hydroxy thiol group.

In some aspects when the hydroxy thiol ester can be described as an ester of a polyol and an hydroxy thiol carboxylic acid or an ester of a polyol and an α-hydroxy thiol carboxylic acid, greater than 20 percent of the hydroxy thiol ester molecule total side chains contain sulfur. In some aspects when the hydroxy thiol ester can be described as an ester of a polyol and an hydroxy thiol carboxylic acid or an ester of a polyol and an α-hydroxy thiol carboxylic acid, greater than 40 percent of the hydroxy thiol ester molecule total side chains contain sulfur. In some aspects when the hydroxy thiol ester can be described as an ester of a polyol and an hydroxy thiol carboxylic acid or an ester of a polyol and an α-hydroxy thiol carboxylic acid, greater than 60 percent of the hydroxy thiol ester molecule total side chains contain sulfur; alternatively, greater than 70 percent of the total side chains contain sulfur; or alternatively, greater than 80 percent of the total side chains contain sulfur.

In particular embodiments, the epoxidized unsaturated ester used in the synthesis of the hydroxy thiol ester is produced from the epoxidized unsaturated ester composition that includes an epoxidized natural source oil. Because the natural source oils have particular compositions regarding the number of ester groups present, the hydroxy thiol ester will have about the same number of ester groups as the natural source oil. Other independent properties that are described herein can be used to further describe the hydroxy thiol ester.

In other embodiments, the epoxidized unsaturated ester used to produce the hydroxy thiol ester is produced from synthetic (or semi-synthetic) unsaturated ester oils. Because the synthetic ester oils can have particular compositions regarding the number of ester groups present, the hydroxy thiol ester would have about the same number of ester groups as the synthetic ester oil. Other independent properties of the unsaturated ester, whether the unsaturated ester includes natural source or synthetic oils, can be used to further describe the hydroxy thiol ester composition.

Examples of suitable hydroxy thiol esters include, but are not limited to, mercaptanized epoxidized vegetable oils, mercaptanized epoxidized soybean oil, mercaptanized castor oil, and mercaptanized epoxidized castor oil. Other suitable mercaptanized epoxidized esters are described in the '675 Applications and are to be considered within the scope of the present invention.

Cross-Linked Thiol Ester Compositions

In an aspect, the feedstock thiol ester compositions include a cross-linked thiol ester composition. Generally, the cross-linked thiol ester molecules are oligomers of thiol esters that are connected together by polysulfide linkages —$S_x$— wherein x is an integer greater than 1. As the cross-linked thiol ester is described as an oligomer of thiol esters, the thiol esters can be described as the monomer from which the cross-linked thiol esters are produced. In embodiments, the cross-linked thiol ester is produced from a mercaptanized unsaturated ester and can be called a cross-linked mercaptanized unsaturated ester. In other embodiments, the cross-linked thiol ester can be produced from a hydroxy thiol ester and can be called a crossed linked hydroxy thiol ester. In yet other embodiments, the crosslinked thiol ester can be produced from a mercaptanized epoxidized ester and can be called a cross-linked mercaptanized epoxidized thiol ester.

In an aspect, the cross-linked thiol ester composition comprises a thiol ester oligomer having at least two thiol ester monomers connected by a polysulfide linkage having a structure —$S_Q$—, wherein Q is an integer greater than 1. In an aspect, the polysulfide linkage can be the polysulfide linkage —$S_Q$—, wherein Q is 2, 3, 4, or mixtures thereof. In other embodiments, Q can be 2; alternatively, 3; or alternatively, 4.

In an aspect, the cross-linked thiol ester composition comprises a thiol ester oligomer having at least 3 thiol ester monomers connected by polysulfide linkages; alternatively, at least 5 thiol ester monomers connected by polysulfide linkages; alternatively, at least 7 thiol ester monomers connected by polysulfide linkages; or alternatively, at least 10 thiol ester monomers connected by polysulfide linkages. In yet other embodiments, the cross-linked thiol ester composition comprises a thiol ester oligomer having from 3 to 20 thiol ester monomers connected by polysulfide linkages; alternatively, from 5 to 15 thiol ester monomers connected by polysulfide linkages; or alternatively, from 7 to 12 thiol ester monomers connected by polysulfide linkages.

In an aspect, the cross-linked thiol ester composition comprises thiol ester monomers and thiol ester oligomers. In some embodiments, the cross-linked thiol ester composition has a combined thiol ester monomer and thiol ester oligomer average molecular weight greater than 2,000. In other embodiments, the cross-linked thiol ester composition has a combined thiol ester monomer and thiol ester oligomer average molecular weight greater than 5,000; or alternatively, greater than 10,000. In yet other embodiments, the cross-linked thiol ester composition has a combined thiol ester monomer and thiol ester oligomer average molecular weight ranging from 2,000 to 20,000; alternatively, from 3,000 to 15,000; or alternatively, from 7,500 to 12,500.

In an aspect, the thiol ester monomers and thiol ester oligomers have a total thiol sulfur content greater than 0.5 weight percent. In other embodiments, the thiol ester monomers and thiol ester oligomers have a total thiol sulfur content greater than 1 weight percent; alternatively, greater than 2 weight percent; or alternatively, greater than 4 weight percent. In yet other embodiments, the thiol ester monomers and the thiol ester oligomers have a total thiol sulfur content from 0.5 to 8 weight percent; alternatively, from 4 to 8 weight percent; or alternatively, 0.5 to 4 weight percent.

In an aspect, the thiol ester monomers and thiol ester oligomers have a total sulfur content greater than 8 weight percent. In some embodiments, the thiol ester monomers and thiol ester oligomers have a total sulfur content greater than 10 weight percent; or alternatively, greater than 12 weight percent. In yet other embodiments, the thiol ester monomers and thiol ester oligomers have a total sulfur content ranging from 8 to 15 weight percent; alternatively, from 9 to 14 weight percent; or alternatively, from 10 to 13 weight percent.

α,β-Unsaturated Ester Compositions

In an aspect, the poly(β-thioether ester) of the present invention can be produced by contacting the thiol ester composition with the α,β-unsaturated ester composition. Generally, the α,β-unsaturated ester composition is comprised of molecules having multiple groups having structure E2:

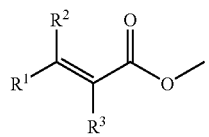

where each $R^1$, $R^2$, and $R^3$ can be H, an organyl group, or a hydrocarbyl group and the undesignated valency represents the remainder of the structure E2. In embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. In yet other embodiments, $R^1$, $R^2$, and $R^3$ are H (an acrylate), or $R^1$ and $R^2$ are H and $R^3$ is a methyl group (a methacrylate), or a combination thereof. In yet other embodiments, $R^1$, $R^2$, and $R^3$ are H (an acrylate); or alternatively, $R^1$ and $R^2$ are H and $R^3$ is a methyl group (a methacrylate). When an α,β-unsaturated ester molecule comprises two or more E2 groups, the additional E2 groups can be located within $R^1$, $R^2$, $R^3$, or the undesignated oxygen valency.

In embodiments, the α,β-unsaturated ester composition comprises an α,β-unsaturated ester having at least 2 α,β-unsaturated ester groups having structure E2. In embodiments, the α,β-unsaturated ester composition can comprise an α,β-unsaturated ester having at least 3 α,β-unsaturated ester groups having structure E2. In some embodiments, the α,β-unsaturated ester composition comprises a mixture of α,β-unsaturated ester molecules having structure E2. When the α,β-unsaturated ester composition comprises a mixture of α,β-unsaturated ester molecules, the α,β-unsaturated ester molecules can have an average of at least 1.5 α,β-unsaturated ester groups having structure E2 per α,β-unsaturated ester molecule; alternatively, an average of at least 2 α,β-unsaturated ester groups having structure E2 per α,β-unsaturated ester molecule; alternatively, an average of at least 2.5 α,β-unsaturated ester groups having structure E2 per α,β-unsaturated ester molecule; or alternatively, an average of at least 3 α,β-unsaturated ester groups having structure E2 per α,β-unsaturated ester molecule. In embodiments, the α,β-unsaturated ester molecules can have an average of from 1.5 to 12 α,β-unsaturated ester groups having structure E2 per α,β-unsaturated ester molecule; alternatively, an average of from 1.5 to 9 α,β-unsaturated ester groups having structure E2 per α,β-unsaturated ester molecule; alternatively, an average of from 2 to 7 α,β-unsaturated ester groups having structure E2 per α,β-unsaturated ester molecule; alternatively, an average of from 2 to 5 α,β-unsaturated ester groups having structure E2 per α,β-unsaturated ester molecule; or alternatively, an average of from 2 to 4 α,β-unsaturated ester groups having structure E2 per α,β-unsaturated ester molecule.

The α,β-unsaturated ester(s) comprising the α,β-unsaturated ester composition can be described as an ester of a polyhydric alcohol (or polyol) and an α,β-unsaturated carboxylic acid. While this description appears to imply that the unsaturated ester is prepared by contacting a polyol with an α,β-unsaturated carboxylic acid, one skilled in the art will recognize that the α,β-unsaturated ester can be prepared in a multitude of methods including reaction of a polyol with an α,β-unsaturated carboxylic acid, reaction of a polyol with an α,β-unsaturated carboxylic acid anhydride, transesterification of a simple α,β-unsaturated ester with a polyol, or reaction of a polyol with an α,β-unsaturated carboxylic acid halide, among other methods. Thus, the manner in which the α,β-unsaturated ester is described does not limit the method(s) by which the α,β-unsaturated ester can be produced. The polyol component can be any aliphatic, cycloaliphatic, or aromatic polyol. The α,β-unsaturated portion of the α,β-unsaturated ester component can be derived from any α,β-unsaturated acid or acid derivative having the structure E2 wherein the undesignated valency can be hydrogen, —OR' group, or a halide atom.

In embodiments, the polyol of the α,β-unsaturated ester composition described as an ester of a polyol and an α,β-unsaturated carboxylic acid comprises at least 2 alcohol groups; alternatively, at least 3 alcohol groups; or alternatively, at least 4 alcohol groups. In some embodiments, the polyol can comprise a mixture of alcohols having an average of at least 1.5 alcohol groups per alcohol molecule; alternatively, an average of at least 2 alcohol groups per alcohol molecule; alternatively, an average of at least 2.5 alcohol groups per alcohol molecule; alternatively, an average of at least 3 alcohol groups per alcohol molecule; alternatively, an average of from 1.5 to 12 alcohol groups per alcohol molecule; alternatively, an average of from 1.5 to 9 alcohol groups per alcohol molecule; alternatively, an average of from 2 to 7 alcohol groups per alcohol molecule; alternatively, an average of from 2 to 5 alcohol groups per alcohol molecule; or alternatively, an average of from 2 to 4 alcohol groups per alcohol molecule.

In embodiments, the polyol of the α,β-unsaturated ester composition described as an ester of a polyol and an α,β-unsaturated acid can comprise ethylene glycol, diethylene glycol, triethylene glycol, tetraethylene glycol, tripropylene glycol, polyethylene glycols with a molecular weight of from 106 to 8500, polyethylene glycols with a molecular weight of from 400 to 2000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or any combination thereof. In some embodiments, the polyol can comprise an ethoxylate, propoxylate, or a mixed ethoxylate/propoxylate of a polyol or mixture of a polyols. In other embodiments, the polyol comprises a polyol ethoxylate product containing from 2 to 400 mol of ethylene oxide per mole of polyol.

In embodiments, the α,β-unsaturated carboxylic acid of the α,β-unsaturated ester composition described as an ester of a polyol and an α,β-unsaturated carboxylic acid comprises acrylic acid, methacrylic acid, crotonoic acid, isocrotonoic acid, itaconic acid, 2-pentenoic acid, tiglic acid, angelic acid, citraconic acid, mesaconic acid, maleic acid, fumaric acid, or mixtures thereof. In some embodiments, the α,β-unsaturated acid comprises acrylic acid, methacrylic acid, cotonoic acid, isorotonic acid, itoconic acid, maleic acid, or any combination thereof, alternatively, acrylic acid, methacrylic acid, or combinations thereof, alternatively, acrylic acid; alternatively; methacrylic acid; or alternatively, maleic acid. Those skilled in the art will recognize that when the α,β-unsaturated ester composition described as an ester of a polyol and an α,β-unsaturated carboxylic acid is not prepared by contacting an α,β-unsaturated acid and a polyol, the appropriate α,β-unsaturated carboxylic acid derivative of the disclosed carboxylic acids can be utilized in the preparation of the α,β-unsaturated ester; e.g. a carboxylic acid anhydride, a simple carboxylic acid ester, or a carboxylic acid halide.

Two general classes of α,β-unsaturated esters that can be used within the α,β-unsaturated ester composition are acrylate compounds and methacrylate compounds. Thus, in embodiments, the α,β-unsaturated ester composition can be an acrylate composition, a methacrylate composition, or a composition comprising acrylates and methacrylates. In some embodiments, the α,β-unsaturated ester composition can be an acrylate composition; alternatively, a methacrylate composition; or alternatively, a composition comprising a mixture of acrylates and methacrylates. Generally, the acrylate/methacrylate composition utilized to form a poly(β-thioether ester) of the present invention can have the same quantity of acrylate and/or methacrylate groups per acrylate/methacrylate molecule as α,β-unsaturated ester groups per α,β-unsaturated ester molecule described herein. In some embodiments, the acrylate composition can comprise a diacrylate, a triacrylate, a tetraacrylate, or mixtures thereof. In other embodiments, the methacrylate composition can comprise a dimethacrylate, a trimethacrylate, a tetramethacrylate, or mixtures thereof. In yet other embodiments, the composition comprising a mixture of acrylates and methacrylates can comprise a combination of at least one diacrylate, triacrylate, or tetraacrylate and at least one dimethacrylate, trimethacrylate, or tetramethacrylate.

In embodiments, acrylates that can be utilized within the acrylate composition include, singly or in any combination thereof, ethylene glycol diacrylate, diethylene glycol diacrylate, triethylene glycol diacrylate, tetraethylene glycol diacrylate, tripropylene glycol diacrylate, 1,2-propanediol diacrylate, 1,3-propanediol diacrylate, 1,2-butanediol diacrylate, 1,3-butanediol diacrylate, 1,4-butanediol diacrylate, 1,5-pentanediol diacrylate, neopentyl glycol diacrylate, 1,2-hexanediol diacrylate, 1,6-hexanediol diacrylate, 1,2-cyclohexanediol diacrylate, 1,4-cyclohexanediol diacrylate, 1,2-octanediol diacrylate, 1,8-octanediol diacrylate, 1,2-decanediol diacrylate, 1,10-decanediol diacrylate, 2-hydroxypropyl-1,3-diacrylate, glycerol diacrylate, glycerol 1,3-diacrylate, glycerol triacrylate, 2,2-dimethylolpropane diacrylate, trimethylolethane triacrylate, trimethylolpropane triacrylate, pentaerythritol diacrylate, pentaerythritol triacrylate, pentaerythritol tetraacrylate, dipentaerythritol diacrylate, dipentaerythritol hexaacrylate, sorbitol diacrylate, sorbitol triacrylate, sorbitol tetraacrylate, sorbitol pentaacrylate, sorbitol hexaacrylate, 1,2,4-butanediol triacrylate, 2,2,4-trimethyl-1,3-pentanediol diacrylate, 1-phenylethylene-1,2-diacrylate, or 1,4-benzenediol diacrylate. In some embodiments, acrylates that can be utilized within the acrylate composition can include, singly or in any combination thereof, bisphenol A diacrylate (2,2-di(4-hydroxyphenyl) propane diacrylate), bisphenol F diacrylate (bis(4-hydroxyphenyl)methane diacrylate), bisphenol S diacrylate (4,4'-dihydroxydiphenylsulfone diacrylate), bisphenol Z diaylate (4,4'-cyclohexylidenebisphenol diacrylate), bis(2-hydroxyphenyl)methane diacrylate, bisphenol A ethoxylate diacrylate, bisphenol A propoxylate diacrylate, bisphenol A glycerolate diacrylate, bisphenol A propoxylate/ethoxylate diacrylate, bisphenol A ethoxylate glycerolate diacrylate, bisphenol A propoxylate glycerolate diacrylate, bisphenol F ethoxylate diacrylate, bisphenol F propoxylate diacrylate, bisphenol F glycerolate diacrylate, bisphenol F propoxylate/ethoxylate diacrylate, bisphenol F ethoxylate glycerolate diacrylate, bisphenol F propoxylate glycerolate diacrylate, bisphenol S ethoxylate diacrylate, bisphenol S propoxylate diacrylate, bisphenol S glycerolate diacrylate, bisphenol S propoxylate/ethoxylate diacrylate, bisphenol S ethoxylate glycerolate diacrylate, bisphenol S propoxylate glycerolate diacrylate, bisphenol Z ethoxylate diacrylate, bisphenol Z propoxylate diacrylate, bisphenol Z glycerolate diacrylate, bisphenol Z propoxylate/ethoxylate diacrylate, bisphenol Z ethoxylate glycerolate diacrylate, bisphenol Z propoxylate glycerolate diacrylate, bis(2-hydroxyphenyl)methane ethoxylate diacrylate, bis(2-hydroxyphenyl)methane propoxylate diacrylate, bis(2-hydroxyphenyl)methane glycerolate diacrylate, bis(2-hydroxyphenyl)methane propoxylate/ethoxylate diacrylate, bis(2-hydroxyphenyl)methane ethoxylate glycerolate diacrylate, or bis(2-hydroxyphenyl) methane propoxylate glycerolate diacrylate.

In embodiments, the methacrylates that can be utilized within the methacrylate composition include, singly or in any combination thereof, ethylene glycol dimethacrylate, diethylene glycol dimethacrylate, triethylene glycol dimethacrylate, tetraethylene glycol dimethacrylate, tripropylene glycol dimethacrylate, 1,2-propanediol dimethacrylate, 1,3-propanediol dimethacrylate, 1,2-butanediol dimethacrylate, 1,3-butanediol dimethacrylate, 1,4-butanediol dimethacrylate, 1,5-pentanediol dimethacrylate, neopentyl glycol dimethacrylate, 1,2-hexanediol dimethacrylate, 1,6-hexanediol dimethacrylate, 1,2-cyclohexanediol dimethacrylate, 1,4-cyclohexanediol dimethacrylate, 1,2-octanediol dimethacrylate, 1,8-octanediol dimethacrylate, 1,2-decanediol dimethacrylate, 1,10-decanediol dimethacrylate, 2-hydroxypropyl-1,3-dimethacrylate, glycerol dimethacrylate, glycerol 1,3-dimethacrylate, glycerol trimethacrylate, 2,2-dimethylolpropane dimethacrylate, trimethylolethane trimethacrylate, trimethylolpropane trimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol dimethacrylate, sorbitol trimethacrylate, sorbitol tetramethacrylate, sorbitol pentamethacrylate, sorbitol hexamethacrylate, 1,2,4-butanediol trimethacrylate, 2,2,4-trimethyl-1,3-pentanediol dimethacrylate, 1-phenylethylene-1,2-dimethacrylate, or 1,4-benzenediol dimethacrylate. In some embodiments, the methacrylates that can be utilized within the methacrylate composition can include, singly or in any combination thereof, bisphenol A dimethacrylate (2,2-di(4-hydroxyphenyl)propane dimethacrylate), bisphenol F dimethacrylate (bis(4-hydroxyphenyl)methane dimethacrylate), bisphenol Z dimethacrylate (4,4'-cyclohexylidenebisphenol dimethacrylate), bis(2-hydroxyphenyl)methane dimethacrylate, bisphenol A ethoxylate dimethacrylate, bisphenol A propoxylate dimethacrylate, bisphenol A glycerolate dimethacrylate, bisphenol A propoxylate/ethoxylate dimethacrylate, bisphenol A ethoxylate glycerolate dimethacrylate, bisphenol A propoxylate glycerolate dimethacrylate, bisphenol F ethoxylate dimethacrylate, bisphenol F propoxylate dimethacrylate, bisphenol F glycerolate dimethacrylate, bisphenol F propoxylate/ethoxylate dimethacrylate, bisphenol F ethoxylate glycerolate dimethacrylate, bisphenol F propoxylate glycerolate dimethacrylate, bisphenol Z ethoxylate dimethacrylate, bisphenol Z propoxylate dimethacrylate, bisphenol Z glycerolate dimethacrylate, bisphenol Z propoxylate/ethoxylate dimethacrylate, bisphenol Z ethoxylate glycerolate dimethacrylate, bisphenol Z propoxylate glycerolate dimethacrylate, bis(2-hydroxyphenyl)methane ethoxylate dimethacrylate, bis(2-hydroxyphenyl)methane propoxylate dimethacrylate, bis(2-hydroxyphenyl)methane glycerolate dimethacrylate, bis(2-hydroxyphenyl)methane propoxylate/ethoxylate dimethacrylate, bis(2-hydroxyphenyl)methane ethoxylate glycerolate dimethacrylate, or bis(2-hydroxyphenyl)methane propoxylate glycerolate dimethacrylate.

α,β-Unsaturated Amide Compositions

In an aspect, the poly(β-thioether amide) of the present invention can be produced by contacting a thiol ester composition with the α,β-unsaturated amide composition. Generally, the α,β-unsaturated amide composition is comprised of molecules having multiple groups having structure E3:

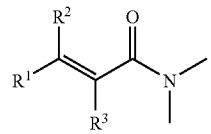

where each $R^1$, $R^2$, and $R^3$ can be H, an organyl group, or a hydrocarbyl group and the undesignated valencies represent the remainder of the structure E3. In embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. In yet other embodiments, $R^1$, $R^2$, and $R^3$ are H (an acrylamide), or $R^1$ and $R^2$ are H and $R^3$ is a methyl group (a methacrylamide), or a combination thereof In yet other embodiments, $R^1$, $R^2$, and $R^3$ are H (an acrylamide); or alternatively, $R^1$ and $R^2$ are H and $R^3$ is a methyl group (a methacrylamide). When an α,β-unsaturated amide molecule comprises two or more E3 groups, the additional E3 groups can be located within $R^1$, $R^2$, $R^3$ and/or one of the undesignated nitrogen valencies.

In embodiments, the α,β-unsaturated amide composition comprises an α,β-unsaturated amide having at least 2 α,β-unsaturated amide groups having structure E3. In embodiments, the α,β-unsaturated amide composition can comprise an α,β-unsaturated amide having at least 3 α,β-unsaturated amide groups having structure E3. In some embodiments, the α,β-unsaturated amide composition comprises a mixture of α,β-unsaturated amide molecules having structure E3. When the α,β-unsaturated amide composition comprises a mixture of α,β-unsaturated amide molecules, the α,β-unsaturated amide molecules can have an average of at least 1.5 α,β-unsaturated amide groups having structure E3 per α,β-unsaturated amide molecule; alternatively, an average of at least 2 α,β-unsaturated amide groups having structure E3 per α,β-unsaturated amide molecule; alternatively, an average of at least 2.5 α,β-unsaturated amide groups having structure E3 per α,β-unsaturated amide molecule; or alternatively, an average of at least 3 α,β-unsaturated amide groups having structure E3 per α,β-unsaturated amide molecule. In embodiments, the α,β-unsaturated amide molecules can have an average of from 1.5 to 12 α,β-unsaturated amide groups having structure E3 per α,β-unsaturated amide molecule; alternatively, an average of from 1.5 to 9 α,β-unsaturated amide groups having structure E3 per α,β-unsaturated amide molecule; alternatively, an average of from 2 to 7 α,β-unsaturated amide groups having structure E3 per α,β-unsaturated amide molecule; alternatively, an average of from 2 to 5 α,β-unsaturated amide groups having structure E3 per α,β-unsaturated amide molecule; or alternatively, an average of from 2 to 4 α,β-unsaturated amide groups having structure E3 per α,β-unsaturated amide molecule.

The α,β-unsaturated amide(s) comprising the α,β-unsaturated amide composition can be described as an amide of a polyamine and an α,β-unsaturated carboxylic acid. While this description appears to imply that the unsaturated amide is prepared by contacting a polyamine with an α,β-unsaturated carboxylic acid, one skilled in the art will recognize that the α,β-unsaturated amide can be prepared in a multitude of methods including reaction of a polyamine with an α,β-unsaturated carboxylic acid, reaction of a polyamine with an α,β-unsaturated carboxylic acid anhydride, reaction of a simple α,β-unsaturated carboxylic acid ester with a polyamine, or reaction of a polyamine with a α,β-unsaturated carboxylic acid halide among other methods. Thus, the manner in which the α,β-unsaturated amide is described does not limit the method(s) by which the α,β-unsaturated amide can be produced. The polyamine component can be any aliphatic, cycloaliphatic, or aromatic polyamine. The α,β-unsaturated portion of the α,β-unsaturated amide component can be derived from any α,β-unsaturated carboxylic acid or acid derivative having the structure E3 wherein the undesignated valency can be hydrogen, —OR' group, or a halide atom.

In embodiments, the polyamine of the α,β-unsaturated amide described as an amide of a polyamine and an α,β-unsaturated acid can be derived from a polyamine comprises at least 2 primary or secondary amine groups; alternatively, at least 3 primary or secondary amine groups; or alternatively, at least 4 primary or secondary amine groups. In embodiments, the polyamine can comprise a mixture of amines having an average of at least 1.5 primary or secondary amine groups per amine molecule; alternatively, an average of at least 2 primary or secondary amine groups per amine molecule; alternatively, an average of at least 2.5 primary or secondary amine groups per amine molecule; alternatively, an average of at least 3 primary or secondary amine groups per amine molecule; alternatively, an average of from 1.5 to 12 primary or secondary amine groups per amine molecule; alternatively, an average of from 1.5 to 9 primary or secondary amine groups per amine molecule; alternatively, an average of from 2 to 7 primary or secondary amine groups per amine molecule; alternatively, an average of from 2 to 5 primary or secondary amine groups per amine molecule; or alternatively, an average of from 2 to 4 primary or secondary amine groups per amine molecule.

In embodiments, the polyamine of the α,β-unsaturated amide described as an amide of a polyamine and an α,β-unsaturated carboxylic acid comprises, singly or in any combination, methylenediamine, ethylenediamine, diethylenetriamine (N-(2-aminoethyl)-1,2-ethanediamine), triethylenetetramine (1,2-ethanediamine,N,N'-bis(2-aminoethyl), N-(2-aminoethyl)-1,3-propanediamine, N,N'-1,2-ethanediylbis-1,3-propanediamine, tetraethylene pentamine, pentaethylene hexamine, 1,2-propanediamine, 1,3-propanediamine, dipropylene triamine, tributylene tetramine, trimethylhexamethylene diamine, hexamethylene triamine, tetramethylpropylenediamine, tetrabutylenepentamine, 1,2-butanediamine, 1,3-butanediamine, 1,4-butylenediamine, 1,5-pentanediamine, 1,6-hexanediamine, 1,7-heptanediamine, octanediamine, decanediamine, dodecanediamine, 1,2-diaminocyclohexane 1,4-diaminocyclohexane, 1,3-bisaminocyclohexylamine, 4,4'-methylenebiscyclohexanamine, isophoronediamine, o-xylylenediamine, m-xylylenediamine, p-xylylenediamine, Methylene diamine dianilene, diaminodiphenylmethane, bisphenylenediamine, diaminodiphenylsulfone, or N-aminoethyl piperazine. In some embodiments, the polyamine can comprise polyalkylenepolyamines, polyethyleneamines, or mixtures thereof. In other embodiments, the polyamine can comprise polyalkylenepolyamines; or alternatively, polyethyleneamines.

In embodiments, the α,β-unsaturated acid of the α,β-unsaturated amide composition described as an amide of a polyamine and an α,β-unsaturated carboxylic acid comprises acrylic acid, methacrylic acid, crotonoic acid, isocrotonoic acid, itaconic acid, 2-pentenoic acid, tiglic acid, angelic acid, citraconic acid, mesaconic acid, maleic acid, fumaric acid, or mixtures thereof. In some embodiments, the α,β-unsaturated carboxylic acid comprises acrylic acid, methacrylic acid, cotonoic acid, isorotonic acid, itoconic acid, maleic acid, or any combination thereof; alternatively, acrylic acid, methacrylic acid, or combinations thereof; alternatively, acrylic acid; alternatively; methacrylic acid; or alternatively, maleic acid. Those skilled in the art will recognize that when the α,β-unsaturated amide composition described as an ester of a polyamine and an α,β-unsaturated carboxylic acid is not prepared by contacting an α,β-unsaturated acid and a polyamine, the appropriate α,β-unsaturated carboxylic acid derivative of the disclosed carboxylic acids can be utilized in the preparation of the α,β-unsaturated ester e.g. a carboxylic acid anhydride, a simple carboxylic acid ester, or a carboxylic acid halide.

Two general classes of α,β-unsaturated amides that can be used within the α,β-unsaturated amide composition are acrylamide compounds and methacrylamide compounds. Thus, in embodiments, the α,β-unsaturated amide composition can be an acrylamide composition, a methacrylamide composition, or a composition comprising acrylamides and methacrylamides. In some embodiments, the α,β-unsaturated amide composition can be an acrylamide composition; alternatively, a methacrylamide composition; or alternatively, composition comprising a mixture of acrylamides and methacrylamides. Generally, the acrylamide/methacrylamide composition utilized to form a poly(β-thioether ester) of the present invention can have the same quantity of acrylamide and/or methacrylamide groups per acrylamide/methacrylamide molecule as α,β-unsaturated amide groups per α,β-unsaturated amide molecule described herein. In some embodiments, the acrylamide composition can comprise a diacrylamide, a triacrylamide, a tetraacrylamide, or mixtures thereof. In other embodiments, the methacrylamide composition can comprise a dimethacrylamide, a trimethacrylamide, a tetramethacrylamide, or mixtures thereof. In yet other embodiments, the composition comprising a mixture of acrylamides and methacrylamides can comprise a combination of at least one diacrylamide, triacrylamide, or tetraacrylamide and at least one dimethacrylamide, trimethacrylamide, or tetramethacrylamide.

In embodiments, acrylamides that can be utilized within the acrylamide composition can include, singly or in any combination thereof, methane diacrylamide, ethylene diacrylamide, 1,6-hexane diacrylamide, propyl diacrylamide, 1,4-cyclohexane diacrylamide, bis(4-aminocyclohexyl)methane diacrylamide, diethylene triamine trisacrylamide, methane diacrylamide, ethane diacrylamide, triethylenetetramine diacrylamide, 1,2-propane diacrylamide, 1,3-propane diacrylamide, 1,2-butane diacrylamide, 1,3-butane diacrylamide, 1,4-butane diacrylamide, 1,5-pentane diacrylamide, 1,6-hexane diacrylamide, 1,7-heptane diacrylamide, octane diacrylamide, decane diacrylamide, dodecane diacrylamide, cyclohexane 1,2-diacrylamide, cyclohexane 1,4-diacrylamide, 1,3-bisacrylamidocyclohexane, isophorone diacrylamide, o-xylylene diacrylamide, m-xylylene diacrylamide, p-xylylene diacrylamide, methylene diacrylamide dianilene, diacrylamidodiphenylmethane, bisphenylenediacrylamide, diacrylomidodiphenylsulfone, or N-acrylamidoethyl piperazine.

In embodiments, the methacrylamides that can be utilized within the methacrylamide composition can include, singly or in any combination thereof, methane dimethacrylamide, ethane dimethacrylamide, 1,6-hexane dimethacrylamide, propyl dimethacrylamide, 1,4-cyclohexane dimethacrylamide, bis(4-aminocyclohexyl)methane dimethacrylamide, diethylene triamine trismethacrylamide, methane dimethacrylamide, ethane dimethacrylamide, triethylenetetramine dimethacrylamide, 1,2-propane dimethacrylamide, 1,3-propane dimethacrylamide, 1,2-butane dimethacrylamide, 1,3-butane dimethacrylamide, 1,4-butane dimethacrylamide, 1,5-pentane dimethacrylamide, 1,6-hexane dimethacrylamide, 1,7-heptane dimethacrylamide, octane dimethacrylamide, decane dimethacrylamide, dodecane dimethacrylamide, cyclohexane 1,2-dimethacrylamide, cyclohexane 1,4-dimethacrylamide, 1,3-bismethacrylamidocyclohexane, isophorone dimethacrylamide, o-xylylene dimethacrylamide, m-xylylene dimethacrylamide, p-xylylene dimethacrylamide, methylene dimethacrylamide dianiline, dimeth-acryl-amido-diphenyl-methane, bisphenylenedimethacrylamide, dimethacrylomidodiphenylsulfone, or N-meth-acryl-amido-ethyl piperazine.

α,β-Unsaturated Ketone Compositions

In an aspect, the poly(β-thioether ketone) of the present invention can be produced by contacting a thiol ester composition with the α,β-unsaturated ketone composition. Generally, the α,β-unsaturated ketone composition is comprised of molecules having multiple groups having structure E4:

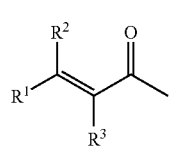

E4 where each $R^1$, $R^2$, and $R^3$ can be H, an organyl group, or a hydrocarbyl group and the undesignated valency represents the remainder of the structure of the E4. In embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each R, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. When an α,β-unsaturated ester molecule comprises two or more E4 groups, the additional E4 group can be located within $R^1$, $R^2$, $R^3$ and/or the undesignated valency.

In embodiments, the α,β-unsaturated ketone composition comprises an α,β-unsaturated ketone having at least 2 α,β-unsaturated ketone groups having structure E4. In embodiments, the α,β-unsaturated ketone composition can comprise an α,β-unsaturated ketone having at least 3 α,β-unsaturated ketone groups having structure E4. In some embodiments, the α,β-unsaturated ketone composition comprises a mixture of α,β-unsaturated ketone molecules having structure E4. When the α,β-unsaturated ketone composition comprises a mixture of α,β-unsaturated ketone molecules, the α,β-unsaturated ketone molecules can have an average of at least 1.5 α,β-unsaturated ketone groups having structure E4 per α,β-unsaturated ketone molecule; alternatively, an average of at least 2 α,β-unsaturated ketone groups having structure E4 per α,β-unsaturated ketone molecule; alternatively, an average of at least 2.5 α,β-unsaturated ketone groups having structure E4 per α,β-unsaturated ketone molecule; or alternatively, an average of at least 3 α,β-unsaturated ketone groups having structure E4 per α,β-unsaturated ketone molecule. In embodiments, the α,β-unsaturated ketone molecules can have an average of from 1.5 to 12 α,β-unsaturated ketone groups having structure E4 per α,β-unsaturated ketone molecule; alternatively, an average of from 1.5 to 9 α,β-unsaturated ketone groups having structure E4 per α,β-unsaturated ketone molecule; alternatively, an average of from 2 to 7 α,β-unsaturated ketone groups having structure E4 per α,β-unsaturated ketone molecule; alternatively, an average of from 2 to 5 α,β-unsaturated ketone groups having structure E4 per α,β-unsaturated ketone molecule; or alternatively, an average of from 2 to 4 α,β-unsaturated ketone groups having structure E4 per α,β-unsaturated ketone molecule.

In embodiments, α,β-unsaturated ketones that can be utilized within the α,β-unsaturated ketone composition include, singly or in any combination thereof, 1,2-benzoquinone, a substituted 1,2-benzoquinone, 1,4-benzoquinone, a substituted 1,4-benzoquinone, 2,5-cyclohexadienone, a substituted 2,5-cyclohexadienone, tropone, a substituted tropone, 4H-pyran-4-one, a substituted 4H-pyran-4-one, dibenzylideneacetone, a substituted dibenzylideneacetone, or dicinnamal-acetone. In some embodiments, α,β-unsaturated ketones that can be utilized within the α,β-unsaturated ketone composition include, singly or in any combination thereof, 1,2-benzoquinone, 1,4-benzoquinone, 2,5-cyclohexadienone, tropone, 4H-pyran-4-one, dibenzylideneacetone, or dicinnamalacetone; alternatively, 1,2-benzoquinone, 1,4-benzoquinone, 2,5-cyclohexadienone, or 4H-pyran-4-one; alternatively, 1,2-benzoquinone; alternatively, 1,4-benzoquinone; alternatively, tropone; or alternatively, dibenzylideneacetone. In other embodiments, α,β-unsaturated ketones that can be utilized within the α,β-unsaturated ketone composition include, singly or in any combination thereof, a substituted 1,2-benzoquinone, a substituted 1,4-benzoquinone, a substituted 2,5-cyclohexadienone, a substituted tropone, a substituted 4H-pyran-4-one, or a substituted dibenzylideneacetone; alternatively, a substituted 1,2-benzoquinone, a substituted 1,4-benzoquinone, a substituted 2,5-cyclohexadienone, or a substituted 4H-pyran-4-one; alternatively, a substituted 1,2-benzoquinone; alternatively, a substituted 1,4-benzoquinone; alternatively, a substituted tropone; or alternatively, a substituted dibenzylideneacetone. Within the substituted α,β-unsaturated ketone embodiments, each substituent can be a $C_1$ to $C_{10}$ organyl group or a $C_1$ to $C_{10}$ hydrocarbyl group; alternatively, a $C_1$ to $C_5$ organyl group or a $C_1$ to $C_5$ hydrocarbyl group; alternatively, a $C_1$ to $C_5$ organyl group; or a $C_1$ to $C_5$ hydrocarbyl group.

α,β-Unsaturated Nitrile Compositions

In an aspect, the poly(β-thioether nitrile) of the present invention can be produced by contacting a thiol ester composition with the α,β-unsaturated nitrile composition. Generally, the α,β-unsaturated nitrile composition is comprised of molecules having multiple groups having structure E5:

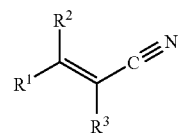

E5 where each $R^1$, $R^2$, and $R^3$ can be H, an organyl group, or a hydrocarbyl group. In embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. When an α,β-unsaturated ester molecule comprises two or more E5 groups, the additional E5 groups can be located within any one or more of $R^1$, $R^2$, or $R^3$.

In embodiments, the α,β-unsaturated nitrile composition comprises an α,β-unsaturated nitrile having at least 2 α,β- unsaturated nitrile groups having structure E5. In embodiments, the α,β-unsaturated nitrile composition can comprise an α,β-unsaturated nitrile having at least 3 α,β-unsaturated nitrile groups having structure E5. In some embodiments, the α,β-unsaturated nitrile composition comprises a mixture of α,β-unsaturated nitrile molecules having structure E5. When the α,β-unsaturated nitrile composition comprises a mixture of α,β-unsaturated nitrile molecules, the α,β-unsaturated nitrile molecules can have an average of at least 1.5 α,β-unsaturated nitrile groups having structure E5 per α,β-unsaturated nitrile molecule; alternatively, an average of at least 2 α,β-unsaturated nitrile groups having structure E5 per α,β-unsaturated nitrile molecule; alternatively, an average of at least 2.5 α,β-unsaturated nitrile groups having structure E5 per α,β-unsaturated nitrile molecule; or alternatively, an average of at least 3 α,β-unsaturated nitrile groups having structure E5 per α,β-unsaturated nitrile molecule. In embodiments, the α,β-unsaturated nitrile molecules can have an average of from 1.5 to 12 α,β-unsaturated nitrile groups having structure E5 per α,β-unsaturated nitrile molecule; alternatively, an average of from 1.5 to 9 α,β-unsaturated nitrile groups having structure E5 per α,β-unsaturated nitrile molecule; alternatively, an average of from 2 to 7 α,β-unsaturated nitrile groups having structure E5 per α,β-unsaturated nitrile molecule; or alternatively, an average of from 2 to 5 α,β-unsaturated nitrile groups having structure E5 per α,β-unsaturated nitrile molecule; or alternatively, an average of from 2 to 4 α,β-unsaturated nitrile groups having structure E5 per α,β-unsaturated nitrile molecule.

Unsaturated Esters

The unsaturated ester used as a feedstock to produce some of the thiol ester compositions described herein can be described using a number of different methods. One method of describing the unsaturated ester feedstock is by the number of ester groups and the number of carbon-carbon double bonds that comprise each unsaturated ester oil molecule. Suitable unsaturated esters used as a feedstock to produce the thiol ester compositions described herein minimally comprise at least 1 ester group and at least 1 carbon-carbon double bond. However, beyond this requirement, the number of ester groups and carbon-carbon double bonds comprising the unsaturated esters are independent elements and can be varied independently of each other. Thus, the unsaturated esters can have any combination of the number of ester groups and the number of carbon-carbon double bonds described separately herein. Suitable, unsaturated esters can also contain additional functional groups such as alcohol, aldehyde, ketone, epoxy, ether, aromatic groups, and combinations thereof. As an example, the unsaturated esters can also comprise hydroxy groups. An example of an unsaturated ester that contains hydroxy groups is castor oil. Other suitable unsaturated esters will be apparent to those of skill in the art and are to be considered within the scope of the present invention.

Minimally, the unsaturated ester comprises at least one ester group. In other embodiments, the unsaturated ester comprises at least 2 ester groups. Alternatively, the unsaturated ester comprises 3 ester groups. Alternatively, the unsaturated ester comprises 4 ester groups. Alternatively, the unsaturated ester includes from 2 to 8 ester groups. Alternatively, the unsaturated ester includes from 2 to 7 ester groups. Alternatively, the unsaturated ester includes from 3 to 5 ester groups. As another alternative, the unsaturated ester includes from 3 to 4 ester groups.

In other embodiments, the unsaturated ester comprises a mixture of unsaturated esters. In these situations, the number of ester groups is best described as an average number of ester groups per unsaturated ester molecule comprising the unsaturated ester composition. In some embodiments, the unsaturated esters have an average of at least 1.5 ester groups per unsaturated ester molecule; alternatively, an average of at least 2 ester groups per unsaturated ester molecule; alternatively, an average of at least 2.5 ester groups per unsaturated ester molecule; or alternatively, an average of at least 3 ester groups per unsaturated ester molecule. In other embodiments, the unsaturated esters have an average of from 1.5 to 8 ester groups per unsaturated ester molecule; alternatively, an average of from 2 to 7 ester groups per unsaturated ester molecule; alternatively, an average of from 2.5 to 5 ester groups per unsaturated ester molecule; or alternatively, an average of from 3 to 4 ester groups per unsaturated ester molecule. In another embodiment, the unsaturated esters have an average of about 3 ester groups per unsaturated ester molecule; or alternatively, an average of about 4 ester groups per unsaturated ester molecule.

Minimally, the unsaturated ester comprises at least one carbon-carbon double bond per unsaturated ester molecule. In an embodiment, the unsaturated ester comprises at least 2 carbon-carbon double bonds; alternatively, at least 3 carbon-carbon double bonds; or alternatively, at least 4 carbon-carbon double bonds. In other embodiments, the unsaturated ester comprises from 2 to 9 carbon-carbon double bonds; alternatively, from 2 to 4 carbon-carbon double bonds; alternatively, from 3 to 8 carbon-carbon double bonds; or alternatively, from 4 to 8 carbon-carbon double bonds.

In some embodiments, the unsaturated ester comprises a mixture of unsaturated esters. In this aspect, the number of carbon-carbon double bonds in the mixture of unsaturated ester is best described as an average number of carbon-carbon double bonds per unsaturated ester oil molecule. In some embodiments, the unsaturated esters have an average of at least 1.5 carbon-carbon double bonds per unsaturated ester molecule; alternatively, an average of at least 2 carbon-carbon double bonds per unsaturated ester molecule; alternatively, an average of at least 2.5 carbon-carbon double bonds per unsaturated ester molecule; or alternatively, an average of at least 3 carbon-carbon double bonds per unsaturated ester molecule. In other embodiments, the unsaturated esters have average of from 1.5 to 9 carbon-carbon double bonds per unsaturated ester molecule; alternatively, an average of from 3 to 8 carbon-carbon double bonds per unsaturated ester molecule; alternatively, an average of from 2 to 4 carbon-carbon double bonds per unsaturated ester molecule; or alternatively, an average of from 4 to 8 carbon-carbon double bonds per unsaturated ester molecule.

While the number (or average number) of ester groups and the number (or average number) of double bonds are independent elements of the unsaturated esters, particular embodiments are mentioned for illustrative purposes. In an embodiment, the unsaturated ester molecules have an average of at least 1.5 ester groups per unsaturated ester molecule and have an average of at least 1.5 carbon-carbon double bonds per unsaturated ester molecule. Alternatively, the unsaturated ester molecules have an average of at least 3 ester groups per unsaturated ester molecule and have an average of at least 1.5 carbon-carbon double bonds per unsaturated ester molecule. Alternatively, the unsaturated ester molecules have an average of at least 3 ester groups per unsaturated ester molecule and have an average of from 1.5 to 9 carbon-carbon double bonds per unsaturated ester molecule. As another alternative, the unsaturated ester molecules have an average of from 2 to 8 ester groups per unsaturated ester molecule and have an average of from 1.5 to 9 carbon-carbon double bonds per unsaturated ester oil.

In addition to the number (or average number) of ester groups and the number (or average number) of carbon-carbon double bonds present in the unsaturated ester molecules, the disposition of the carbon-carbon double bonds in unsaturated ester molecules having 2 or more carbon-carbon double bonds can be a consideration. In some embodiments where the unsaturated ester molecules have 2 or more carbon-carbon double bonds, the carbon-carbon double bonds can be conjugated. In other embodiments, the carbon-carbon double bonds can be separated from each other by only one carbon atom. When two carbon-carbon double bonds are separated by a carbon atom having two hydrogen atoms attached to it, i.e. a methylene group, the carbon-carbon double bonds can be termed as methylene interrupted double bonds. In yet other embodiments, the carbon-carbon double bonds are isolated, i.e. the carbon-carbon double bonds are separated from each other by 2 or more carbon atoms. In further embodiments, the carbon-carbon double bonds can be conjugated with a carbonyl group.

In some aspects, the unsaturated ester can be described as an ester of a polyol and unsaturated carboxylic acids. While this description appears to imply that the unsaturated ester is prepared by contacting a polyol with an unsaturated carboxylic acid, one skilled in the art will recognize that the unsaturated ester can be prepared in a multitude of methods including reaction of a polyol with an unsaturated carboxylic acid, reaction of a polyol with an unsaturated carboxylic acid anhydride, reaction of a simple unsaturated carboxylic acid ester with a polyol, or reaction of a polyol with an unsaturated carboxylic acid halide, among other methods. Thus, the manner in which the unsaturated ester is described does not limit the method(s) by which the unsaturated ester can be produced. Additionally, the manner in which the unsaturated ester is described does not imply that the unsaturated ester is synthetically produced. For example, some natural triglycerides (e.g. soybean, and castor oil, among other) can be described as an ester of glycerol (a polyol) and an unsaturated carboxylic acid.

Within the description of an unsaturated ester is an ester (or unsaturated ester) of a polyol and an unsaturated carboxylic acid, the unsaturated carboxylic acid portion of the unsaturated ester can be called a polyol side chain (i.e. a side chain). In some embodiments, the unsaturated ester comprises less than 30 percent of side chains comprising methylene interrupted double bonds. In other embodiments, embodiments the unsaturated ester comprises greater than 30 percent of the side chains comprise methylene interrupted double bonds. In yet other embodiments, the unsaturated ester comprises less than 25 percent of side chains having 3 contiguous methylene interrupted carbon-carbon double bonds. In further embodiments, the unsaturated ester comprises less than 25 percent linolenic side chains. In further embodiments, the unsaturated ester comprises greater than 25 percent of side chains having 3 contiguous methylene interrupted carbon-carbon double bonds. In further embodiments, the unsaturated ester comprises greater than 25 percent linolenic side chains. In additional embodiments, the unsaturated ester comprises at least 30 percent side chains having 2 contiguous methylene interrupted carbon-carbon double bonds and less than 25 percent of side chains having 3 contiguous methylene interrupted carbon-carbon double bonds.

Additional functional groups can also be present in the unsaturated ester. A non-limiting list of functional groups includes a hydroxy group, an ether group, aldehyde group, a ketone group, an amine group, a carboxylic acid group among others, and combinations thereof. In an aspect, the unsaturated ester can comprise hydroxy groups. In some embodiments, the unsaturated esters have an average of at least 1.5 hydroxy groups per unsaturated ester molecule; alternatively, an average of at least 2 hydroxy groups per unsaturated ester molecule; alternatively, an average of at least 2.5 hydroxy groups per unsaturated ester molecule; or alternatively, an average of at least 3 hydroxy groups per unsaturated ester molecule. In other embodiments, the unsaturated esters have an average of from 1.5 to 9 hydroxy groups per unsaturated ester molecule; alternatively, an average of from 3 to 8 hydroxy groups per unsaturated ester molecule; alternatively, an average of from 2 to 4 hydroxy groups per unsaturated ester molecule; or alternatively, an average of from 4 to 8 hydroxy groups per unsaturated ester molecule. In an embodiment, the unsaturated ester comprises at least 2 hydroxy groups; alternatively, at least 3 hydroxy groups; or alternatively, at least 4 hydroxy groups. In other embodiments, the unsaturated ester comprises from 2 to 9 hydroxy groups; alternatively, from 2 to 4 hydroxy groups; alternatively, from 3 to 8 hydroxy groups; or alternatively, from 4 to 8 hydroxy groups.

The unsaturated esters utilized to produce the thiol ester compositions can be any unsaturated ester having any number of ester groups and carbon-carbon double bonds per unsaturated ester described herein. The unsaturated esters can be derived from natural sources, synthetically produced from natural source raw materials, produced from synthetic raw materials, produced from a mixture of natural and synthetic materials, or combinations thereof.

Unsaturated Natural Source Oil

In an embodiment, the unsaturated ester is unsaturated natural source oil. The unsaturated natural source oil can be derived from naturally occurring nut, vegetable, plant, and animal sources. In an embodiment, the unsaturated ester comprises a triglyceride derived from naturally occurring nuts, vegetables, plant, and animal sources. In an embodiment, the unsaturated ester can be derived from genetically modified nuts, vegetables, plant, and animal sources. In an embodiment, the unsaturated ester oil comprises a triglyceride derived from genetically modified nuts, vegetables, plant, animal sources, and combinations thereof.

In an aspect, the unsaturated natural source oil can be tallow, olive, peanut, castor bean, sunflower, sesame, poppy, seed, palm, almond seed, hazelnut, rapeseed, canola, soybean, corn, safflower, canola, cottonseed, camelina, flaxseed, or walnut oil. In some embodiment, the unsaturated natural source oil can be soybean, corn, castor bean, safflower, canola, cottonseed, camelina, flaxseed, walnut oil, and combinations thereof. In further embodiments, the unsaturated natural source oil can be soybean oil; alternatively, corn oil; alternatively, castor bean oil; or alternatively, canola oil.

The unsaturated natural source oils are comprised of triglycerides that can be described as an ester of glycerol and an unsaturated carboxylic acid. Within this description, the unsaturated carboxylic acid portion of the triglyceride can be called a glycerol side chain (i.e. a side chain). In some embodiments, the triglyceride comprises less than 30 percent of side chains comprising methylene interrupted double bonds. In other embodiments, embodiments the triglyceride comprises greater than 30 percent of the side chains comprise methylene interrupted double bonds. In yet other embodiments, the triglyceride comprises less than 25 percent of side chains having 3 contiguous methylene interrupted carbon-carbon double bonds. In further embodiments, the triglyceride comprises less than 25 percent linolenic side chains. In further embodiments, the triglyceride comprises greater than 25 percent of side chains having 3 contiguous methylene interrupted carbon-carbon double bonds. In further embodiments, the triglyceride comprises greater than 25 percent linolenic side chains. In additional embodiments, the triglyceride comprises at least 30 percent side chains having 2 contiguous methylene interrupted carbon-carbon double bonds and less than 25 percent of side chains having 3 contiguous methylene interrupted carbon-carbon double bonds.

In another embodiment, the unsaturated natural ester oil comprises "natural" triglycerides derived from unsaturated natural source oils. In an embodiment, the unsaturated ester oil is synthetic. In an embodiment, the unsaturated ester oil comprises both synthetic and natural raw materials. In an embodiment, the unsaturated ester oil comprises synthetic triglycerides.

Synthetic Unsaturated Esters

Synthetic unsaturated esters used as feedstock for aspects of this invention can be produced using methods for producing an ester group known to those skilled in the art. The term "ester group" means a moiety formed from the reaction of a hydroxy group and a carboxylic acid or a carboxylic acid derivative. Typically, the esters can be produced by reacting an alcohol with a carboxylic acid, transesterification of carboxylic acid ester with an alcohol, reacting an alcohol with a carboxylic acid anhydride, or reacting an alcohol with a carboxylic acid halide. Any of these methods can be used to produce the synthetic unsaturated ester oils used as a feedstock in an aspect of this invention. The alcohol, unsaturated carboxylic acid, unsaturated carboxylic acid ester, unsaturated carboxylic acid anhydride raw materials for the production of the unsaturated ester oil can be derived from natural, synthetic, genetic, or any combination of natural, genetic, and synthetic sources.

The polyols and the unsaturated carboxylic acids, simple unsaturated carboxylic acid esters, or unsaturated carboxylic acid anhydrides used to produce the unsaturated esters used as a feedstock in various aspects of this invention are independent elements. That is, these elements can be varied independently of each other and thus, can be used in any combination to produce an unsaturated ester utilized as a feedstock to produce the compositions described in this application or as a feedstock for the processes described in this application.

Synthetic Unsaturated Ester Oils-Polyol Component

The polyol used to produce the unsaturated ester oil can be any polyol or mixture of polyols capable of reacting with an unsaturated carboxylic acid, unsaturated simple carboxylic acid ester, carboxylic acid anhydride, or carboxylic acid halide under reaction conditions apparent to those skilled in the art.

The number of carbon atoms in the polyol can be varied. In one aspect, the polyol used to produce the unsaturated ester can comprise from 2 to 20 carbon atoms. In other embodiments, the polyol comprises from 2 to 10 carbon atoms; alternatively, from 2 to 7 carbon atoms; or alternatively, from 2 to 5 carbon atoms. In further embodiments, the polyol can be a mixture of polyols having an average of 2 to 20 carbon atoms; alternatively, an average of from 2 to 10 carbon atoms; alternatively, an average of 2 to 7 carbon atoms; or alternatively, an average of 2 to 5 carbon atoms.

In another aspect, the polyol used to produce the unsaturated ester can have any number of hydroxy groups needed to produce the unsaturated ester as described herein. In some embodiments, the polyol has 2 hydroxy groups; alternatively, 3 hydroxy groups; alternatively, 4 hydroxy groups; alternatively, 5 hydroxy groups; or alternatively, 6 hydroxy groups. In other embodiments, the polyol comprises at least 2 hydroxy groups; alternatively, at least 3 hydroxy groups; alternatively, at least 4 hydroxy groups; alternatively, at least 5 hydroxy groups; or alternatively, at least 6 hydroxy groups. In yet other embodiments, the polyol comprises from 2 to 8 hydroxy groups; alternatively, from 2 to 4 hydroxy groups; or alternatively, from 4 to 8 hydroxy groups.

In further aspects, the polyol used to produce the unsaturated ester is a mixture of polyols. In an embodiment, the mixture of polyols has an average of at least 1.5 hydroxy groups per polyol molecule. In other embodiments, the mixture of polyols has an average of at least 2 hydroxy groups per polyol molecule; alternatively, an average of at least 2.5 hydroxy groups per polyol molecule; alternatively, an average of at least 3.0 hydroxy groups per polyol molecule; or alternatively, an average of at least 4 hydroxy groups per polyol molecule. In yet other embodiments, the mixture of polyols has an average of 1.5 to 8 hydroxy groups per polyol molecule; alternatively, an average of 2 to 6 hydroxy groups per polyol molecule; alternatively, an average of 2.5 to 5 hydroxy groups per polyol molecule; alternatively, an average of 3 to 4 hydroxy groups per polyol molecule; alternatively, an average of 2.5 to 3.5 hydroxy groups per polyol molecule; or alternatively, an average of 2.5 to 4.5 hydroxy groups per polyol molecule.

In yet another aspect, the polyol or mixture of polyols used to produce the unsaturated thiol ester has a molecular weight or average molecular weight less than 500. In other embodiments, the polyol or mixture of polyols have a molecular weight or average molecular weight less than 300; alternatively, less than 200; alternatively, less than 150; or alternatively, less than 100.

In some embodiments, suitable polyols include 1,2-ethanediol, 1,3-propanediol, 1,4-butanediol, 1,5-pentanediol, 1,6-hexanediol, dimethylolpropane, neopentylpropane, 2-propyl-2-ethyl-1,3-propanediol, 1,2-propanediol, 1,3-butanediol, diethylene glycol, triethylene glycol, polyethylene glycol, dipropylene glycol, tripropylene glycol, polypropylene glycol, cyclohexanedimethanol, 1,3-dioxane-5,5-dimethanol, 1,4-xylylenedimethanol, 1-phenyl-1,2-ethanediol, trimethylolpropane, trimethylolethane, trimethylolbutane, glycerol, 1,2,5-hexanetriol, pentaerythritol, ditrimethylolpropane, diglycerol, ditrimethylolethane, 1,3,5-trihydroxybenzene, 1,4-xylylenedimethanol, 1-phenyl-1,2-ethanediol, or any combination thereof. In further embodiments, the polyol is glycerol, pentaerythritol, or mixtures thereof In other embodiments, the polyol is glycerol; or alternatively, pentaerythritol.

Synthetic Unsaturated Ester-Carboxylic Acid or Carboxylic Acid Equivalent Component The carboxylic acid component of the unsaturated ester oil can be any carboxylic acid or mixture of carboxylic acids comprising a carbon-carbon double bond. As the carboxylic acid component will be combined with a polyol or polyol mixture comprising an average of greater than 1.5 hydroxy groups or any other number of hydroxy groups described herein, the carboxylic acid component can be any mixture comprising unsaturated carboxylic acids that produces an unsaturated ester oil meeting the feedstock requirements described herein. In some embodiments, the carboxylic acid component can be any mixture of saturated carboxylic acid and unsaturated carboxylic acid that produces an unsaturated ester oil meeting the feedstock requirements described herein. Thus, the carboxylic acid or carboxylic acid mixture used to produce the synthetic unsaturated ester oil can be described as having an average number of a specified element per carboxylic acid.

Independent elements of the carboxylic acid include the average number of carboxylic acid groups per carboxylic acid molecule, the average number of carbon atoms present in the carboxylic acid, and the average number of carbon-carbon double bonds per carboxylic acid. Additional independent elements include the position of the double bond in the carbon chain and the relative position of the double bonds with respect to each other when there are multiple double bonds.

Specific carboxylic acids used to produce the unsaturated ester oil can have from 3 to 30 carbon atoms per carboxylic acid molecule. In some embodiments, the carboxylic acid is linear. In some embodiments, the carboxylic acid is branched. In some embodiments, the carboxylic acid is a mixture of linear and branched carboxylic acids. In some embodiments, the carboxylic acid can also comprise additional functional groups including alcohols, aldehydes, ketones, and epoxides, among others.

Suitable carboxylic acids that can be used as a component of the unsaturated carboxylic acid composition can have from about 3 to about 30 carbon atoms; alternatively, 8 to 25 carbon atoms; or alternatively, from 12 to 20 carbon atoms. In other embodiments, the carboxylic acids comprising the unsaturated carboxylic acid composition comprise an average of 3 to 30 carbon atoms; alternatively, an average of 8 to 25 carbon atoms; or alternatively, an average of from 12 to 20 carbon atoms.

The carbon-carbon double bond can be located anywhere along the length of the carbon-carbon chain. In one embodiment, the double bond can be located at a terminal position. In another embodiment, the carbon-carbon double bond can be located at an internal position. In yet another embodiment, the carboxylic acid or mixture of carboxylic acids can comprise both terminal and internal carbon-carbon double bonds. The double bond can also be described by indicating the number of substitutes that are attached to the carbon-carbon double bond. In some embodiments, the carbon-carbon double bond can be mono-substituted, disubstituted, trisubstituted, tetra-substituted, or a mixture of unsaturated carboxylic acids that can have any combination of monosubstituted, disubstituted, trisubstituted and tetrasubstituted carbon-carbon double bonds.

Suitable unsaturated carboxylic acids include acrylic, agonandoic, agonandric, alchornoic, ambrettolic, angelic, asclepic, auricolic, avenoleic, axillarenic, brassidic, caproleic, cetelaidic, cetoleic, civetic, coriolic, coronaric, crepenynic, densipolic, dihomolinoleic, dihomotaxoleic, dimorphecolic, elaidic, ephedrenic, erucic, gadelaidic, gadoleic, gaidic, gondolo, gondoleic, gorlic, helenynolic, hydrosorbic, isoricinoleic, keteleeronic, labellenic, lauroleic, lesquerolic, linelaidic, linderic, linoleic, lumequic, malvalic, mangold's acid, margarolic, megatomic, mikusch's acid, mycolipenic, myristelaidic, nervoic, obtusilic, oleic, palmitelaidic, petroselaidic, petroselinic, phlomic, physeteric, phytenoic, pyrulic, ricinelaidic, rumenic, selacholeic, sorbic, stearolic, sterculic, sterculynic, stillingic, strophanthus, tariric, taxoleic, traumatic, tsuduic, tsuzuic, undecylenic, vaccenic, vernolic, ximenic, ximenynic, ximenynolic, and combinations thereof. In further embodiments, suitable unsaturated carboxylic acids include oleic, palmitoleic, ricinoleic, linoleic, and combination thereof. Other suitable unsaturated carboxylic acids will be apparent to those persons having ordinary skill in the art and are to be considered within the scope of the present invention.

In some embodiments, the unsaturated ester can be produced by transesterification of a simple ester of the carboxylic acid or mixture of carboxylic acids described herein with the polyol compositions described herein. In some embodiments, the simple ester is a methyl or ethyl ester of the carboxylic acid or mixture of carboxylic acids. In further embodiments, the simple carboxylic acid ester is a methyl ester of the carboxylic acids described herein.

Epoxidized Unsaturated Esters

In an aspect, epoxidized unsaturated esters are used as a feedstock to produce materials described herein and for the processes to produce the material described herein. Generally, the epoxidized unsaturated ester can be derived by epoxidizing any unsaturated ester described herein. The unsaturated ester oil can be derived from natural sources, synthetically produced from natural source raw materials, produced from synthetic raw materials, produced from a mixture of natural and synthetic materials, or a combination thereof.

Minimally, the epoxidized unsaturated ester comprises at least one epoxide group. In an embodiment, the epoxidized unsaturated ester comprises at least 2 epoxide groups; alternatively, at least 3 epoxide groups; or alternatively, at least 4 epoxide groups. In other embodiments, the epoxidized unsaturated ester comprises from 2 to 9 epoxide groups; alternatively, from 2 to 4 epoxide groups; alternatively, from 3 to 8 epoxide groups; or alternatively, from 4 to 8 epoxide groups.

In some embodiments, the unsaturated ester comprises a mixture of epoxidized unsaturated esters. In this aspect, the number of epoxide groups in the epoxidized unsaturated ester can be described as an average number of epoxide groups per epoxidized unsaturated ester molecule. In some embodiments, the epoxidized unsaturated esters have an average of at least 1.5 epoxide groups per epoxidized unsaturated ester molecule; alternatively, an average of at least 2 epoxide groups per epoxidized unsaturated ester molecule; alternatively, an average of at least 2.5 epoxide groups per epoxidized unsaturated ester molecule; or alternatively, an average of at least 3 epoxide groups per epoxidized unsaturated ester molecule. In other embodiments, the epoxidized unsaturated esters have an average of from 1.5 to 9 epoxide groups per epoxidized unsaturated ester molecule; alternatively, an average of from 3 to 8 epoxide groups per epoxidized unsaturated ester molecule; alternatively, an average of from 2 to 4 epoxide groups per epoxidized unsaturated ester molecule; or alternatively, an average of from 4 to 8 epoxide group per epoxidized unsaturated ester molecule.

In an aspect, the epoxidized unsaturated ester can be an epoxidized unsaturated natural source oil. The unsaturated natural source oil can be derived from naturally occurring nut, vegetable, plant, and animal sources. In an embodiment, the unsaturated ester oil is derived from genetically modified nuts, vegetables, plant, and animal sources. In an embodiment, the unsaturated ester oil comprises a triglyceride derived from genetically modified nuts, vegetables, plant, and animal sources.

In an aspect, the feedstock natural source oil for the epoxidized natural source oil can be tallow, olive, peanut, castor bean, sunflower, sesame, poppy, seed, palm, almond seed, hazelnut, rapeseed, canola, soybean, corn, safflower, canola, cottonseed, camelina, flaxseed, or walnut oil. In some embodiments, the feedstock natural source oil for the epoxidized natural source oil can be soybean, corn, castor bean, safflower, canola, cottonseed, camelina, flaxseed, or walnut oil. In further embodiments, the feedstock natural source oil for the epoxidized natural source oil can be soybean oil; alternatively, corn oil; alternatively, castor bean oil; or alternatively, canola oil. Consequently, the epoxidized natural source oil can be referred to using the prefix of epoxidized before the specific natural source oil; e.g. epoxidized soybean oil, epoxidized canola oil, or epoxidized castor oil.

EXAMPLES

Poly(β-thioether ester) Preparation

Mercaptanized Soybean Oil (MSO), Mercaptohydroxy Soybean Oil (MHSO), Cross-linked Mercaptanized Soybean Oil (CMSO-Oligomerized MSO), or Mercaptanized Castor Oil (MCaO) (all referred to hereinafter as cross-linking agent) was weighed into a polyethylene beaker. The desired acrylate was added to the cross-linking agent to produce a reaction mixture. The acrylates that were used to produce the reaction mixture included 1,4-butanediol diacrylate (BDDA), ethylene glycol dimethacrylate (EGDM), bisphenol A ethoxylate diacrylate 1.5 EO/phenol (BAEDA 1.5), trimethylolpropane triacrylate (TMPTA), trimethylolpropane trimethacrylate (TMPTMA), hexanediol diacrylate (HDDA), and pentaerythritol triacrylate (PETA). The cross-linking agent and the acrylates were fed using the equivalent molar ratios of the number of SH groups to acrylate groups shown in Table 1, which is attached as FIG. 1.

The desired catalyst was added to the reaction mixture. The catalyst used to produce the poly(β-thioether ester) compositions was DBU. The three-component reaction mixture was then manually stirred with a wooden stick. The entire prepolymer mixture was then poured into the appropriate mold for curing. Example molds include 50 mm diameter or 70 mm diameter aluminum pans. The sample was then cured at 65° C. overnight and then cured at 95° C. for 24 hours. After the cure time was complete, the sample was stored at room temperature in plastic, resealing, sandwich bags for 2 weeks. The samples were then observed for various properties. The results of the observations are located in the Table 1.

APPLICATIONS

Embodiments of the present invention are useful in numerous applications. For example, embodiments of the invention are useful in various polymer applications that include, but are not limited to, foams, adhesives, epoxy hardening agents, polyacrylates and polymethacrylate templates for paints and polyester resins, printing ink binder polymers, alkyd resin cross-linkers, sulfur based paint template, radiation cured polymers, mining and drilling chemicals, specialty chain transfer agents, rubber modifiers, and the like. Because the feedstock materials are economical and readily available, it is believed that embodiments of the present would be useful in such applications and others.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A poly(β-thioether ester) polymer comprising:
   a Michael addition product of
      a thiol ester composition comprising:
         1) thiol ester molecules derived from an unsaturated natural source oil;
         2) hydroxy thiol ester molecules derived from an epoxidized unsaturated natural source oil; or
         3) crosslinked thiol ester oligomers having at least three thiol ester monomers derived from an unsaturated natural source oil or three hydroxy thiol ester monomers derived from an epoxidized unsaturated natural source oil connected by polysulfide linkages having the structure —$S_Q$—, wherein Q is greater than 1, and
      an α,β-unsaturated ester.

2. The poly(β-thioether ester) polymer of claim 1, wherein the thiol ester composition comprises:
   the hydroxy thiol ester molecules derived from an epoxidized unsaturated natural source oil,
   the hydroxy thiol ester molecules having
      an average of from 1.5 to 9 thiol groups per thiol ester molecule,
      an average of from 1.5 to 9 hydroxy groups per hydroxy thiol ester molecule,
      an average of from 2 to 7 ester groups per hydroxy thiol ester molecule, and
      an average of from 5 to 25 weight percent thiol sulfur per hydroxy thiol ester molecule.

3. The poly(β-thioether ester) polymer of claim 1, wherein the thiol ester composition comprises:
   the hydroxy thiol ester molecules derived from an epoxidized unsaturated natural source oil,
   the hydroxy thiol ester molecules having
      an average of from 1.5 to 9 α-hydroxy thiol groups per hydroxy thiol ester molecule,
      an average of from 2 to 7 ester groups per hydroxy thiol ester molecule, and
      an average of from 5 to 25 weight percent thiol sulfur per hydroxy thiol ester molecule.

4. The poly(β-thioether ester) polymer of claim 1, wherein the thiol ester composition comprises the crosslinked thiol ester oligomers, the crosslinked thiol ester oligomers having at least three thiol ester monomers derived from an unsaturated natural source oil or three hydroxy thiol ester monomers derived from an epoxidized unsaturated natural source oil connected by polysulfide linkages having the structure —$S_Q$—, wherein Q is greater than 1.

5. The poly(β-thioether ester) polymer of claim 1, wherein the thiol ester composition comprises:
   the thiol ester molecules derived from an unsaturated natural source oil,
   the thiol esters molecules having
      an average of from 1.5 to 8 ester groups per thiol ester molecule,
      an average of from 1.5 to 9 thiol groups per thiol ester molecule,
      an average of at least 5 weight percent thiol sulfur per thiol ester molecule, and
      an average molar ratio of cyclic sulfides to thiol groups per thiol ester molecule less than 1.0.

6. The poly(β-thioether ester) polymer of claim 1, wherein the α,β-unsaturated ester is an acrylate, methacrylate, or combinations thereof.

7. The poly(β-thioether ester) polymer of claim 6, wherein the acrylate comprises an average of from 1.5 to 16 acrylate groups per acrylate molecule.

8. The poly(β-thioether ester) polymer of claim 1, having a glass transition temperature ranging between about −100° C. to about 250° C.

9. A method of making a poly(β-thioether ester) polymer via Michael addition comprising the steps of:
(a) contacting
a thiol ester composition comprising:
thiol ester molecules derived from an unsaturated natural source oil,
a hydroxy thiol ester composition comprising hydroxy thiol ester molecules derived from an epoxidized unsaturated natural source oil, or
a crosslinked thiol ester composition comprising thiol ester oligomers having at least three thiol ester monomers derived from an unsaturated natural source oil or three hydroxy thiol ester monomers derived from an epoxidized unsaturated natural source oil connected by polysulfide linkages having the structure —$S_Q$—, wherein Q is greater than 1, and
an α,β-unsaturated ester to form a mixture; and
(b) curing the mixture to produce the poly(β-thioether ester) polymer.

10. The method of claim 9, wherein a catalyst is included in forming the mixture.

11. The method of claim 10, wherein the catalyst is an amine.

12. The method of claim 9, wherein the curing step comprises heating the mixture to a temperature ranging from about 50° C. to about 100° C.

13. The method of claim 9, wherein the thiol ester composition comprises:
the hydroxy thiol ester molecules derived from an epoxidized unsaturated natural source oil,
the hydroxy thiol ester molecules having
an average of from 1.5 to 9 thiol groups per thiol ester molecule,
an average of from 1.5 to 9 hydroxy groups per hydroxy thiol ester molecule,
an average of from 2 to 7 ester groups per hydroxy thiol ester molecule, and
an average of from 5 to 25 weight percent thiol sulfur per hydroxy thiol ester molecule.

14. The method of claim 9, wherein the thiol ester composition comprises:
the hydroxy thiol ester molecules derived from an epoxidized unsaturated natural source oil,
the hydroxy thiol ester molecules having
an average of from 1.5 to 9 α-hydroxy thiol groups per hydroxy thiol ester molecule
an average of from 2 to 7 ester groups per hydroxy thiol ester molecule, and
an average of from 5 to 25 weight percent thiol sulfur per hydroxy thiol ester molecule.

15. The method of claim 9, wherein the thiol ester composition comprises the crosslinked thiol ester oligomers, the crosslinked thiol ester oligomers having at least three thiol ester monomers derived from an unsaturated natural source oil or three hydroxy thiol ester monomers derived from an epoxidized unsaturated natural source oil connected by polysulfide linkages having the structure —$S_Q$—, wherein Q is greater than 1.

16. The method of claim 9, wherein the thiol ester composition comprises:
the thiol ester molecules derived from an unsaturated natural source oil,
the thiol esters molecules having
an average of from 1.5 to 8 ester groups per thiol ester molecule,
an average of from 1.5 to 9 thiol groups per thiol ester molecule,
an average of at least 5 weight percent thiol sulfur per thiol ester molecule, and
an average molar ratio of cyclic sulfides to thiol groups per thiol ester molecule less than 1.0.

17. The method of claim 9, wherein the α,β-unsaturated ester is an acrylate, a methacrylate, or combinations thereof.

18. The method of claim 17, wherein the acrylate comprises an average of from 1.5 to 16 acrylate groups per acrylate molecule.

19. The method of claim 9, wherein the poly(β-thioether ester) polymer has a glass transition temperature ranging between about −100° C. to about 250° C.

20. The method of claim 9, wherein a molar ratio of —SH groups of the thiol containing ester to acrylate groups of the αβ-unsaturated ester ranges from about 0.9 to about 1.3.

21. The poly(β-thioether ester) polymer of claim 2, wherein the epoxidized unsaturated natural source oil is epoxidized soybean oil, epoxidized corn oil, epoxidized castor bean oil, or epoxidized canola oil.

22. The poly(β-thioether ester) polymer of claim 2, wherein the epoxidized unsaturated natural source oil is epoxidized soybean oil.

23. The poly(β-thioether ester) polymer of claim 1, wherein the thiol ester composition comprises:
the hydroxyl thiol ester molecules derived from an epoxidized unsaturated natural source oil,
the hydroxy thiol ester molecules having
an average of from 2 to 5 thiol groups per hydroxy thiol ester molecule,
an average of from 2 to 5 hydroxy groups per hydroxy thiol ester molecule,
an average of from 2 to 4 ester groups per hydroxy thiol ester molecule, and
an average of from 6 to 15 weight percent thiol sulfur per hydroxy thiol ester molecule.

24. The poly(β-thioether ester) polymer of claim 23, wherein the epoxidized unsaturated natural source oil is epoxidized soybean oil, epoxidized corn oil, epoxidized castor bean oil, or epoxidized canola oil.

25. The poly(β-thioether ester) polymer of claim 23, wherein the epoxidized unsaturated natural source oil is epoxidized soybean oil.

26. The poly(β-thioether ester) polymer of claim 5, wherein the unsaturated natural source oil is soybean oil, corn oil, castor bean oil, or canola oil.

27. The poly(β-thioether ester) polymer of claim 5, wherein the unsaturated natural source oil is soybean oil or castor bean oil.

28. The poly(β-thioether ester) polymer of claim 1, wherein the thiol ester composition comprises:
the thiol ester molecules derived from an unsaturated natural source oil,
the thiol ester molecules having
an average of from 2.5 to 5 ester groups per thiol ester molecule,
an average of 2 to 4 thiol groups per thiol ester molecule,
an average of from 6 to 15 weight percent thiol sulfur per thiol ester molecule, and
an average molar ratio of cyclic sulfide groups to thiol groups per thiol ester molecule less than 0.5.

29. The poly(β-thioether ester) polymer of claim 28, wherein the unsaturated natural source oil is soybean oil, corn oil, castor bean oil, or canola oil.

30. The poly(β-thioether ester) polymer of claim 28, wherein the unsaturated natural source oil is soybean oil or castor bean oil.

31. The poly(β-thioether ester) polymer of claim 4, wherein the crosslinked thiol ester oligomers comprise at least three thiol ester monomers derived from an unsaturated natural source oil, and wherein the unsaturated natural source oil is soybean oil, corn oil, castor bean oil, or canola oil.

32. The poly(β-thioether ester) polymer of claim 4, wherein the crosslinked thiol ester oligomers comprise at least three thiol ester monomers derived from an unsaturated natural source oil, and wherein the unsaturated natural source oil is soybean oil.

33. The poly(β-thioether ester) polymer of claim 4, wherein the crosslinked thiol ester oligomers comprise at least three hydroxy thiol ester monomers derived from an epoxidized unsaturated natural source oil, and wherein the epoxidized unsaturated natural source oil is epoxidized soybean oil, epoxidized corn oil., epoxidized castor bean oil, or epoxidized canola oil.

34. The poly(β-thioether ester) polymer of claim 4, wherein the crosslinked thiol ester oligomers comprise at least three hydroxy thiol ester monomers derived from an epoxidized unsaturated natural source oil, and wherein the epoxidized unsaturated natural source oil is epoxidized soybean oil.

35. The method of claim 13, wherein the epoxidized unsaturated natural source oil is epoxidized soybean oil, epoxidized corn oil, epoxidized castor bean oil, or epoxidized canola oil.

36. The method of claim 13, wherein the epoxidized unsaturated natural source oil is epoxidized soybean oil.

37. The method of claim 9, wherein the thiol ester composition comprises:
   the hydroxyl thiol ester molecules derived from an epoxidized unsaturated natural source oil,
   the hydroxy thiol ester molecules having
      an average of from 2 to 5 thiol groups per hydroxy thiol ester molecule,
      an average of from 2 to 5 hydroxy groups per hydroxy thiol ester molecule,
      an average of from 2 to 4 ester groups per hydroxy thiol ester molecule, and
      an average of from 6 to 15 weight percent thiol sulfur per hydroxy thiol ester molecule.

38. The method of claim 37, wherein the epoxidized unsaturated natural source oil is epoxidized soybean oil, epoxidized corn oil, epoxidized castor bean oil, or epoxidized canola oil.

39. The method of claim 37, wherein the epoxidized unsaturated natural source oil is epoxidized soybean oil.

40. The method of claim 16, wherein the unsaturated natural source oil is soybean oil, corn oil, castor bean oil, or canola oil.

41. The method of claim 16, wherein the unsaturated natural source oil is soybean oil or castor bean oil.

42. The method of claim 9, wherein the thiol ester composition comprises:
   the thiol ester molecules derived from an unsaturated natural source oil,
   the thiol ester molecules having
      an average of from 2.5 to 5 ester groups per thiol ester molecule,
      an average of 2 to 4 thiol groups per thiol ester molecule,
      an average of from 6 to 15 weight percent thiol sulfur per thiol ester molecule, and
      an average molar ratio of cyclic sulfide groups to thiol groups per thiol ester molecule less than 0.5.

43. The method of claim 42, wherein the unsaturated natural source oil is soybean oil, corn oil, castor bean oil, or canola oil.

44. The method of claim 42, wherein the unsaturated natural source oil is soybean oil or castor bean oil.

45. The method of claim 15, wherein the crosslinked thiol ester oligomers comprise at least three thiol ester monomers derived from an unsaturated natural source oil, and wherein the unsaturated natural source oil is soybean oil, corn oil, castor bean oil, or canola oil.

46. The method of claim 15, wherein the crosslinked thiol ester oligomers comprise at least three thiol ester monomers derived from an unsaturated natural source oil, and wherein the unsaturated natural source oil is soybean oil.

47. The method of claim 15, wherein the crosslinked hydroxy thiol ester oligomers comprise at least three hydroxy thiol ester monomers derived from an epoxidized unsaturated natural source oil, and wherein the epoxidized unsaturated natural source oil is epoxidized soybean oil, epoxidized corn oil, epoxidized castor bean oil, or epoxidized canola oil.

48. The method of claim 15, wherein the crosslinked hydroxy thiol ester oligomers comprise crosslinked hydroxy thiol ester oligomers having at least three hydroxy thiol ester monomers derived from an epoxidized unsaturated natural source oil, and wherein the epoxidized unsaturated natural source oil is epoxidized soybean oil.

* * * * *